United States Patent
Huang et al.

(10) Patent No.: US 7,949,530 B2
(45) Date of Patent: *May 24, 2011

(54) CONVERSATION CONTROLLER

(75) Inventors: Shengyang Huang, Tokyo (JP); Hiroshi Katukura, Tokyo (JP)

(73) Assignees: Universal Entertainment Corporation, Tokyo (JP); PtoPA Inc., Tokyo (JP)

( * ) Notice: Subject to any disclaimer, the term of this patent is extended or adjusted under 35 U.S.C. 154(b) by 900 days.

This patent is subject to a terminal disclaimer.

(21) Appl. No.: 11/581,372

(22) Filed: Oct. 17, 2006

(65) Prior Publication Data

US 2007/0094003 A1    Apr. 26, 2007

(30) Foreign Application Priority Data

Oct. 21, 2005   (JP) ................................. 2005-307868

(51) Int. Cl.
*G10L 15/00* (2006.01)
*G10L 15/04* (2006.01)
*G10L 15/18* (2006.01)
*G10L 11/00* (2006.01)
*G10L 21/00* (2006.01)

(52) U.S. Cl. ........ 704/270; 704/251; 704/257; 704/275; 704/270.1

(58) Field of Classification Search .......... 704/270–275, 704/251, 257

See application file for complete search history.

(56) References Cited

U.S. PATENT DOCUMENTS

| | | | |
|---|---|---|---|
| 6,044,347 A * | 3/2000 | Abella et al. .................. | 704/272 |
| 6,101,492 A | 8/2000 | Jacquemin et al. | |
| 6,173,266 B1 * | 1/2001 | Marx et al. ..................... | 704/270 |
| 6,314,402 B1 * | 11/2001 | Monaco et al. ................ | 704/275 |
| 6,321,198 B1 * | 11/2001 | Hank et al. ..................... | 704/270 |
| 6,324,513 B1 | 11/2001 | Nagai et al. | |
| 6,356,869 B1 * | 3/2002 | Chapados et al. ............. | 704/275 |
| 6,385,583 B1 * | 5/2002 | Ladd et al. ..................... | 704/270 |
| 6,411,924 B1 | 6/2002 | de Hita et al. | |
| 6,434,525 B1 * | 8/2002 | Nagisa et al. .................. | 704/260 |
| 6,505,162 B1 * | 1/2003 | Wang et al. .................... | 704/275 |

(Continued)

FOREIGN PATENT DOCUMENTS

JP     04169969     6/1992

(Continued)

OTHER PUBLICATIONS

U.S. Appl. No. 10/511,236; Final Office Action, mailed Aug. 3, 2009.

(Continued)

*Primary Examiner* — Eric Yen
(74) *Attorney, Agent, or Firm* — NDQ&M Watchstone LLP

(57) ABSTRACT

A conversation controller outputs a reply sentence according to a user utterance. The conversation controller comprises a conversation database and a conversation control unit. The conversation database stores a plurality of plans. Each plan has a reply sentence and one or more pieces of next plan designation information for designating a next candidate reply sentence to be output following the reply sentence. The conversation control unit selects one of the plans stored in the conversation database according to a user utterance and outputs a reply sentence which the selected plan has. Then, the conversation control unit selects one piece of the next plan designation information which the plan has according to a next user utterance and outputs a next candidate reply sentence on the basis of the selected piece of the next plan designation information. Some plans have a series of questions as the reply sentences.

4 Claims, 22 Drawing Sheets

U.S. PATENT DOCUMENTS

| | | | |
|---|---|---|---|
| 6,510,411 B1* | 1/2003 | Norton et al. | 704/254 |
| 6,553,345 B1 | 4/2003 | Kuhn et al. | |
| 6,901,402 B1 | 5/2005 | Corston-Oliver et al. | |
| 6,944,594 B2* | 9/2005 | Busayapongchai et al. | 704/275 |
| 7,003,459 B1* | 2/2006 | Gorin et al. | 704/240 |
| 7,016,849 B2* | 3/2006 | Arnold et al. | 704/275 |
| 7,020,607 B2 | 3/2006 | Adachi | |
| 7,177,817 B1 | 2/2007 | Khosla et al. | |
| 7,197,460 B1 | 3/2007 | Gupta et al. | |
| 7,305,070 B2 | 12/2007 | Kortum et al. | |
| 7,415,406 B2 | 8/2008 | Huang et al. | |
| 2002/0143776 A1 | 10/2002 | Hirose et al. | |
| 2003/0163321 A1* | 8/2003 | Mault | 704/270 |
| 2004/0098245 A1 | 5/2004 | Walker et al. | |
| 2005/0144013 A1 | 6/2005 | Fujimoto et al. | |
| 2006/0020473 A1 | 1/2006 | Hiroe et al. | |
| 2006/0074634 A1* | 4/2006 | Gao et al. | 704/9 |
| 2006/0149555 A1* | 7/2006 | Fabbrizio et al. | 704/275 |
| 2007/0101394 A1 | 5/2007 | Fu | |

FOREIGN PATENT DOCUMENTS

| | | |
|---|---|---|
| JP | 07-282134 A | 10/1995 |
| JP | 11143493 | 5/1999 |
| JP | 2001357053 | 12/2001 |
| JP | 2004-145606 A | 5/2004 |
| JP | 2004258902 | 9/2004 |
| JP | 2004258903 | 9/2004 |
| JP | 2004258904 | 9/2004 |

OTHER PUBLICATIONS

U.S. Appl. No. 10/511,236; Non-Final Office Action, mailed Nov. 25, 2008.

U.S. Appl. No. 10/511,236; Final Office Action, mailed Feb. 21, 2008.

U.S. Appl. No. 10/511,236; Non-Final Office Action, mailed Aug. 3, 2007.

U.S. Appl. No. 10/511,236; Non-Final Office Action, mailed Dec. 11, 2006.

Schultz, et al; "Morpheme-based, cross-lingual indexing for medical document retrieval"; International Journal of Medical Informatics, Sep. 1, 2000; pp. 87-99, vol. 58-59.

Strom, et al; "Utilizing prosody for unconstrained morpheme recognitions"; Sep. 5, 1999; Proceedings of Euro speech vol. 1, pp. 307-310.

Byrne, et al; "Morpheme based language models for speech recognition of czech"; Sep. 13, 2000 Text, Speech and Dialogue, International Workshop, TSD, Proceedings; pp. 211-216.

U.S. Appl. No. 11/581,373, Final Office Action, mailed Feb. 17, 2010.

U.S. Appl. No. 11/581,373, Non-Final Office Action, mailed Aug. 17, 2009.

Lin, et al; "A Distributed Architecture for Cooperative Spoken Dialog Agents With Coherent Dialog State and History," Proc. ASRU-99, Keystone, Co., 1999, pp. 1-4.

Meteer, et al.; "Modeling Conversational Speech for Speech Recognition"; In Proceedings of the Conference on Empirical Methods in Natural Language Processing, 1996; pp. 33-47.

U.S. Appl. No. 11/581,585, Final Office Action, mailed Mar. 16, 2010.

Official Action from corresponding Chinese case, dated Dec. 11, 2009; English Translation included.

U.S. Appl. No. 11/581,585, Final Office Action, mailed Oct. 6, 2009.

Office Action issued on Jul. 22, 2010 in the corresponding to the European Patent Application No. 03745994.8-1527.

\* cited by examiner

FIG. 6

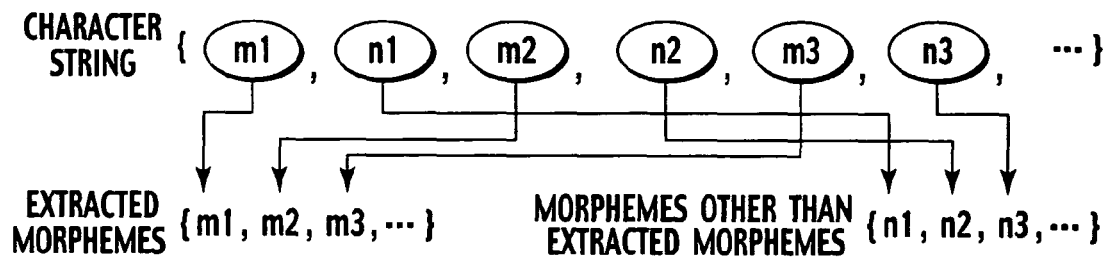

CHARACTER STRING { m1, n1, m2, n2, m3, n3, ··· }

EXTRACTED MORPHEMES { m1, m2, m3, ··· }

MORPHEMES OTHER THAN EXTRACTED MORPHEMES { n1, n2, n3, ··· }

FIG. 7

| TYPES OF UTTERED SENTENCES | | DATA EXAMPLE |
|---|---|---|
| DA | DECLARATIVE AFFIRMATIVE SENTENCE | I LIKE SATO. |
| LA | LOCATIONAL AFFIRMATIVE SENTENCE | I LIKE SATO'S SERIOUS FACE WHEN HE IS AT BAT. |
| NA | NEGATIONAL AFFIRMATIVE SENTENCE | I DO NOT WANT TO TALK WITH ANYONE WHO DISLIKES SATO. |
| DQ | DECLARATIVE INTERROGATIVE SENTENCE | DO YOU LIKE SATO? |
| LQ | LOCATIONAL INTERROGATIVE SENTENCE | HOW DO YOU LIKE SATO AT BAT? |
| NQ | NEGATIONAL INTERROGATIVE SENTENCE | IT IS NOT TRUE YOU LIKE SATO, IS IT? |
| ⋮ | ⋮ | ⋮ |

FIG. 8

| TYPE OF DETERMINATION | USED DICTIONARY |
|---|---|
| D | DEFINITION EXPRESSION DICTIONARY |
| N | NEGATIONAL EXPRESSION DICTIONARY |
| ⋮ | ⋮ |

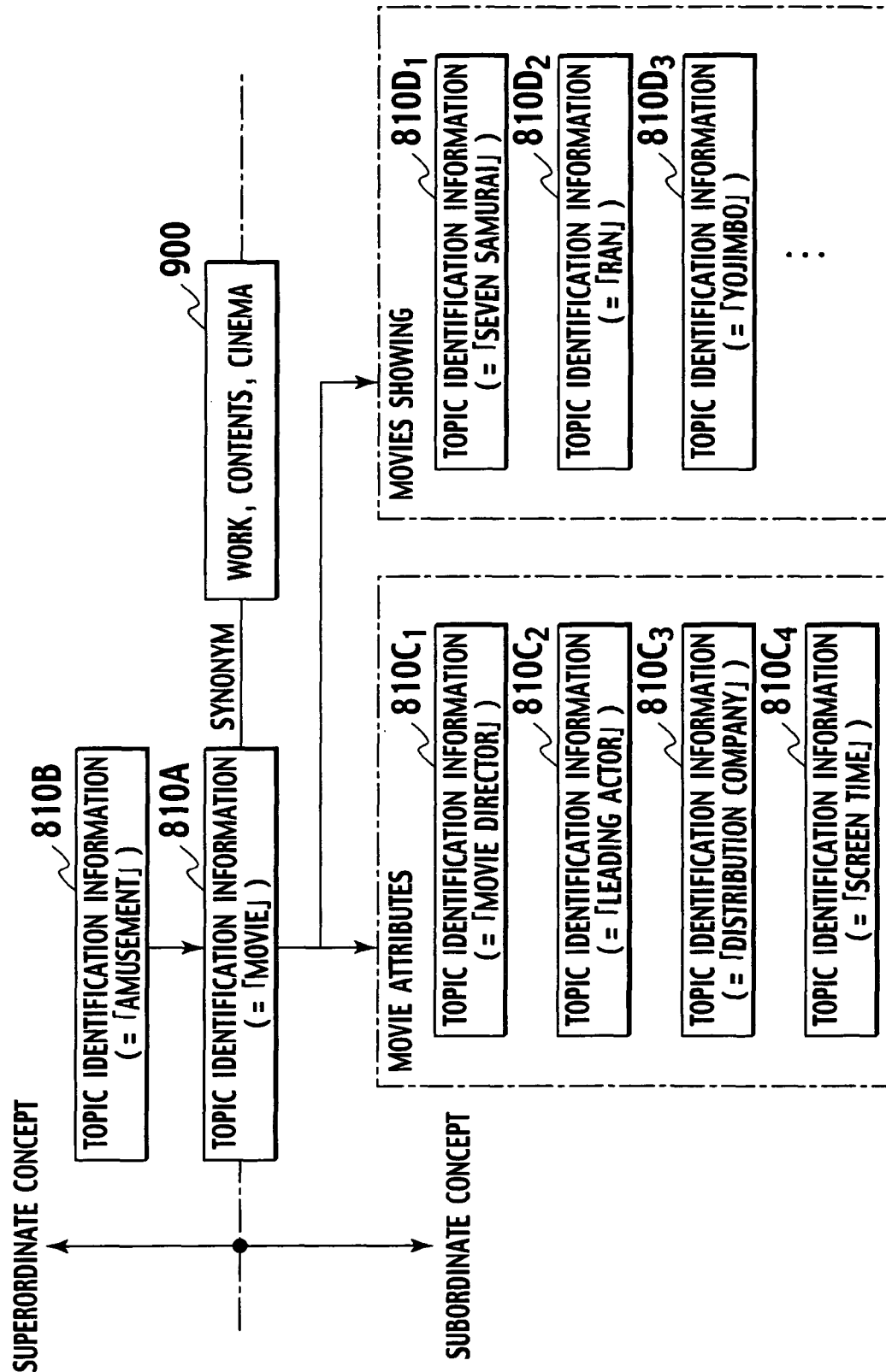

FIG. 11

| TOPIC TITLE (SECOND MORPHEME INFORMATION) | | | |
|---|---|---|---|
| | FIRST IDENTIFICATION INFORMATION | SECOND IDENTIFICATION INFORMATION | THIRD IDENTIFICATION INFORMATION |
| TOPIC IDENTIFICATION INFORMATION (=「SEVEN SAMURAI」) | SEVEN SAMURAI | * | * |
| | SEVEN SAMURAI | * | INTERESTING |
| | ... | ... | ... |
| TOPIC IDENTIFICATION INFORMATION (=「RAN」) | RAN | * | * |
| | RAN | * | INTERESTING |
| | ... | ... | ... |
| TOPIC IDENTIFICATION INFORMATION (=「YOJIMBO」) | YOJIMBO | * | * |
| | YOJIMBO | * | INTERESTING |
| | ... | ... | ... |

| TYPE | CONTENTS |
|---|---|
| D | DECLARATIVE SENTENCE |
| T | DECLARATIVE SENTENCE INCLUDING IDEA OF TIME SUCH AS "WHEN" |
| L | DECLARATIVE SENTENCE INCLUDING IDEA OF LOCATION SUCH AS "WHERE" |
| N | SENTENCE NEGATING DECLARATIVE SENTENCE |
| ... | ... |

FIG. 13

TOPIC IDENTIFICATION INFORMATION (="SATO")
SUPERORDINATE CONCEPT TOPIC IDENTIFICATION INFORMATION (="SANDLOT BASEBALL")
SUBORDINATE CONCEPT TOPIC IDENTIFICATION INFORMATION (="HOME RUN")
SYNONYM (="PANDA SATO, PLAYER SATO, PANDA")

| | | TYPE OF RESPONSE | CONTENTS | NEXT PLAN DESIGNATION INFORMATION |
|---|---|---|---|---|
| TOPIC TITLE 1-1 (SATO; *; LIKE) | REPLY SENTENCE 1-1 | DA | 「I LIKE SATO TOO.」 | ID 「000010」 |
| | | TA | 「I LIKE SATO AT BAT.」 | ID 「000011」 |
| | | ... | ... | ... |
| TOPIC TITLE 1-2 | REPLY SENTENCE 1-2 | ... | ... | ... |
| ... | ... | | | |

810, 820, 830, 840

CONVERSATION CONTROLLER

CROSS REFERENCE TO RELATED APPLICATION

This application claims benefit of priority under 35 U.S.C. §119 to Japanese Patent Application No. 2005-307868, filed on Oct. 21, 2005, the entire contents of which are incorporated by reference herein.

BACKGROUND OF THE INVENTION

1. Field of the Invention

The present invention relates to a conversation controller configured to output an answer or a reply to a user's utterance.

2. Description of the Related Art

Recently, from a viewpoint of a cost reduction and a rapid order process, it is proposed to employ a terminal apparatus instead of a person to take an order from a customer at a restaurant. The conventional terminal apparatuses are disclosed in Japanese Patent Laid-open Publications No. H7-282134 and No. 2004-145606. It is possible to take an order from a customer anytime by employing these terminal appatatuses.

However, it is not necessarily to increase a user service by introducing these terminal apparatuses. In a case where a person takes an order from a customer, the customer can give the person a desired order while talking with the person. On the other hand, in a case where a terminal apparatus takes the order from the customer, the customer selects one or more menus from among various menus displayed on the terminal apparatus to give the terminal apparatus the desired order. In this case, the customer can not select another menu other than the menus displayed on the terminal apparatus.

SUMMARY OF THE INVENTION

It is one object of the present invention to provide a conversation controller allowing a user to take desired information which is previously prepared therein, by repeating a question for the user.

It is another object of the present invention to provide a conversation controller capable of dealing with both of a conversation allowing a user to take desired information which is previously prepared therein and another conversation including another topic other than topics included in the conversation.

In order to achieve the object, the present invention provides a conversation controller configured to output a reply sentence according to a user utterance, comprising: a plan memory unit configured to store a plurality of plans, wherein each plan has a reply sentence and one or more pieces of next candidate designation information for designating a next candidate reply sentence to be output following the reply sentence; and a plan conversation unit configured to select one of the plans stored in the plan memory unit according to a first user utterance and output a reply sentence which the selected plan has, and select one piece of the next candidate designation information which the plan has according to a second user utterance and output a next candidate reply sentence on the basis of the selected piece of the next candidate designation information, wherein some plans have a series of questions for guiding a user to take desired information as the reply sentences.

The following sentence "a series of questions for guiding a user to take desired information" means a plurality of questions related to one or more pieces of information which are previously prepared in the conversation controller. More specifically, "a series of questions for guiding a user to take desired information" is any questions such as a sentence, a text or a word which promotes a user to reply, select or determine such that the user takes the desired information.

According to the present invention, the conversation controller can output information suited or necessary for a user by repeating a question for the user such that the user can take desired information which is previously prepared in the conversation controller.

In a preferred embodiment of the present invention, the plan conversation unit withholds an output of the next candidate reply sentence when receiving the second user utterance which is not related to the next candidate reply sentence or it is unclear whether or not there is a relation between the second user utterance and the next candidate reply sentence, and then outputs the withheld next candidate reply sentence when receiving a third user utterance which is related to the withheld next candidate reply sentence.

According to the embodiment, when user's interest moves toward another matter other than a series of questions, the conversation controller can withhold an output of the series of questions. In contrast, when user's interest returns to the series of questions, the conversation controller can resume the output of the series of questions from a withheld portion of the series of questions.

In a preferred embodiment of the present invention, the conversation controller further comprises a discourse space conversation unit configured to output a reply sentence about a topic which is not related to the withheld next candidate reply sentence according to the second user utterance.

According to the embodiment, when a user wants to talk about another topic other than a topic of a series of questions, the conversation controller can withhold an output of the series of questions and respond to the user according to a user utterance about the another topic. Then, when user's interest returns to the series of questions, the conversation controller can resume the output of the series of questions from a withheld portion of the series of questions. Therefore, the conversation controller can accomplish an output of information suited or necessary for a user by repeating a question for the user such that the user can take desired information which is previously prepared in the conversation controller. That is, the conversation controller allows the user to take the desired information which is previously prepared therein by repeating a question for the user, while inserting a conversation about another topic other than the topic of the series of questions according to a user utterance in the middle of the output of the series of questions.

In a preferred embodiment of the present invention, the conversation controller further comprises a conversation continuation unit configured to output a reply sentence to continue a conversation between a user and the conversation controller according to the second user utterance when not outputting the reply sentence about the topic which is not related to the withheld next candidate reply sentence.

According to the embodiment, when the plan conversation unit or the discourse space conversation unit can not output a reply sentence, the conversation continuation unit outputs a reply sentence to continue a conversation between a user and the conversation controller. Therefore, the conversation controller can withhold an output of a series of questions at the time when contents of a user utterance are unclear and resume the output of the series of questions from a withheld portion of the series of questions at the time when user's interest returns to the series of questions.

BRIEF DESCRIPTION OF THE DRAWINGS

FIG. 6 is a diagram illustrating a relation between a character string and morphemes extracted from the character string according to the first exemplary embodiment of the present invention.

FIG. 7 is a diagram illustrating types of uttered sentences, plural two letters in the alphabet which represent the types of the uttered sentences, and examples of the uttered sentences according to the first exemplary embodiment of the present invention.

FIG. 8 is a diagram illustrating details of dictionaries stored in an utterance type database according to the first exemplary embodiment of the present invention.

FIG. 10 is a diagram illustrating a refinement of topic identification information in the hierarchical structure built in the conversation database according to the first exemplary embodiment of the present invention.

FIG. 11 is a diagram illustrating contents of topic titles formed in the conversation database according to the first exemplary embodiment of the present invention.

FIG. 12 is a diagram illustrating types of reply sentences associated with the topic titles formed in the conversation database according to the first exemplary embodiment of the present invention.

FIG. 13 is a diagram illustrating contents of the topic titles, the reply sentences and next plan designation information associated with the topic identification information according to the first exemplary embodiment of the present invention.

DESCRIPTION OF THE PREFERRED EMBODIMENTS

Hereinafter, first and second exemplary embodiments of the present invention will be described with reference to FIGS. 1 to 26. In the exemplary embodiment, the present invention is proposed as a conversation controller configured to output an answer to a user utterance and establish a conversation with the user.

A. First Exemplary Embodiment (1. Configuration of Conversation Controller)
(1-1. General Configuration)

A conversation controller 1 according to the first exemplary embodiment includes therein an information processor such as a computer or a workstation, or a hardware corresponding to the information processor. The information processor has a central processing unit (CPU), a main memory (random access memory: RAM), a read only memory (ROM), an input-output device (I/O device) and an external storage device such as a hard disk. A program for allowing the information processor to function as the conversation controller 1 and a program for allowing the information processor to execute a conversation control method are stored in the ROM or the external storage device. The CPU reads the program on the main memory and executes the program, which realizes the conversation controller 1 or the conversation control method. It is noted that the program may be stored in a computer-readable program recording medium such as a magnetic disc, an optical disc, a magnetic optical disc, a compact disc (CD) or a digital video disc (DVD), or an external device such as a server of an application service provider (ASP). In this case, the CPU reads the program from the computer-readable program recording medium or the external device on the main memory and executes the program.

Figure 1:
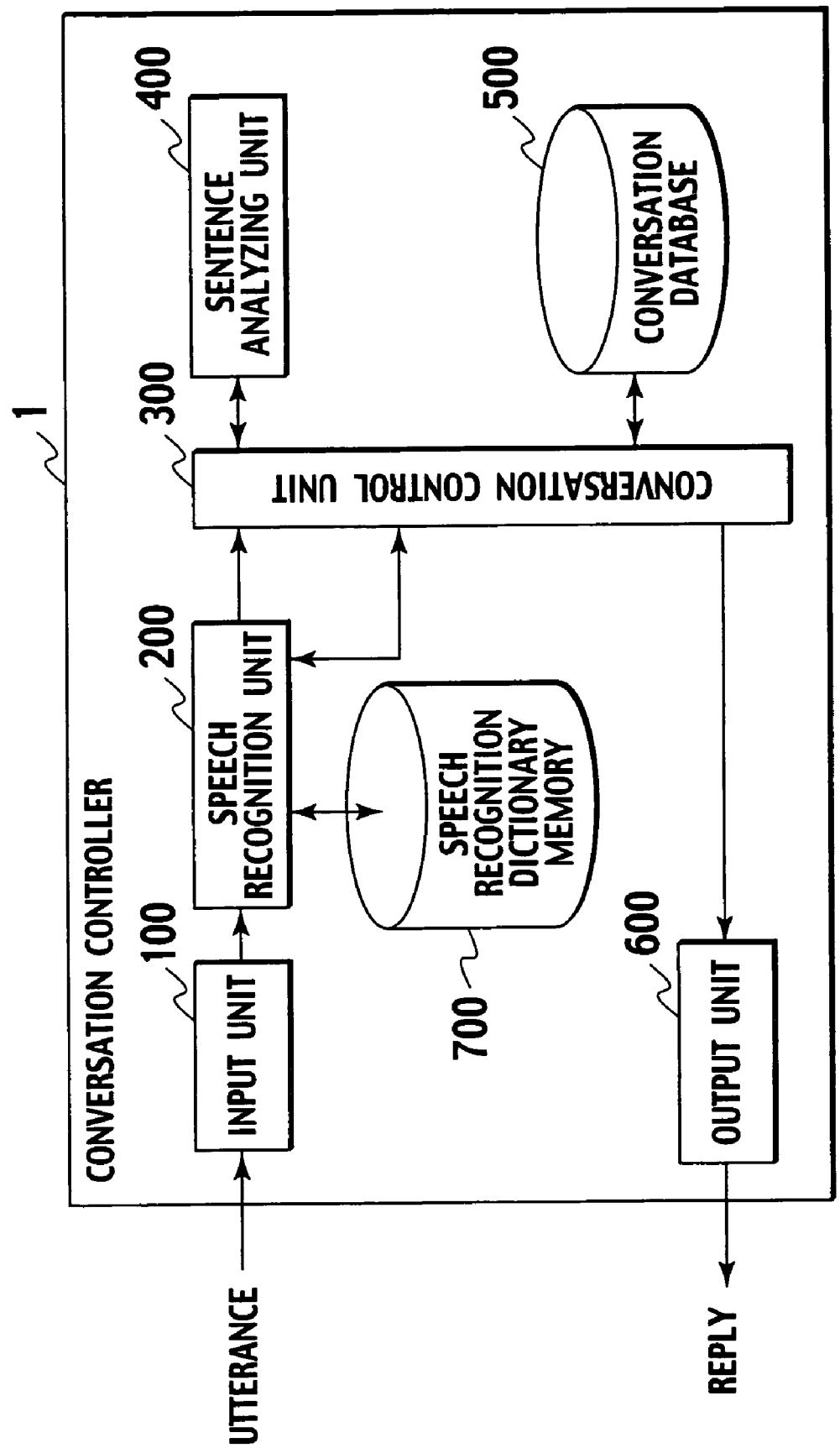
FIG. 1 is a block diagram of a conversation controller according to a first exemplary embodiment of the present invention.

As shown in FIG. 1, the conversation controller 1 comprises an input unit 100, a speech recognition unit 200, a conversation control unit 300, a sentence analyzing unit 400, a conversation database 500, an output unit 600 and a speech recognition dictionary memory 700.

(1-1-1. Input Unit)

The input unit 100 receives input information (user utterance) provided from a user. The input unit 100 outputs a speech corresponding to contents of the received utterance as a speech signal to the speech recognition unit 200. It is noted that the input unit 100 may be a key board or a touch panel for inputting character information. In this case, the speech recognition unit 200 is omitted.

(1-1-2. Speech Recognition Unit)

The speech recognition unit 200 identifies a character string corresponding to the contents of the utterance received at the input device 100, based on the contents of the utterance. Specifically, the speech recognition unit 200, when receiving the speech signal from the input unit 100, compares the received speech signal with the conservation database 500 and dictionaries stored in the speech recognition dictionary memory 700, based on the speech signal. Then, the speech recognition unit 200 outputs to the conversation control unit 300 a speech recognition result estimated based on the speech signal. The speech recognition unit 200 requests acquisition of memory contents of the conversation database 500 to the conversation control unit 300, and then receives the memory contents of the conversation database 500 which the conversation control unit 300 retrieves according to the request from the speech recognition unit 200. It is noted that the speech recognition unit 200 may directly retrieves the memory contents of the conversation database 500.

(1-1-2-1. Configuration of Speech Recognition Unit)

Figure 2:
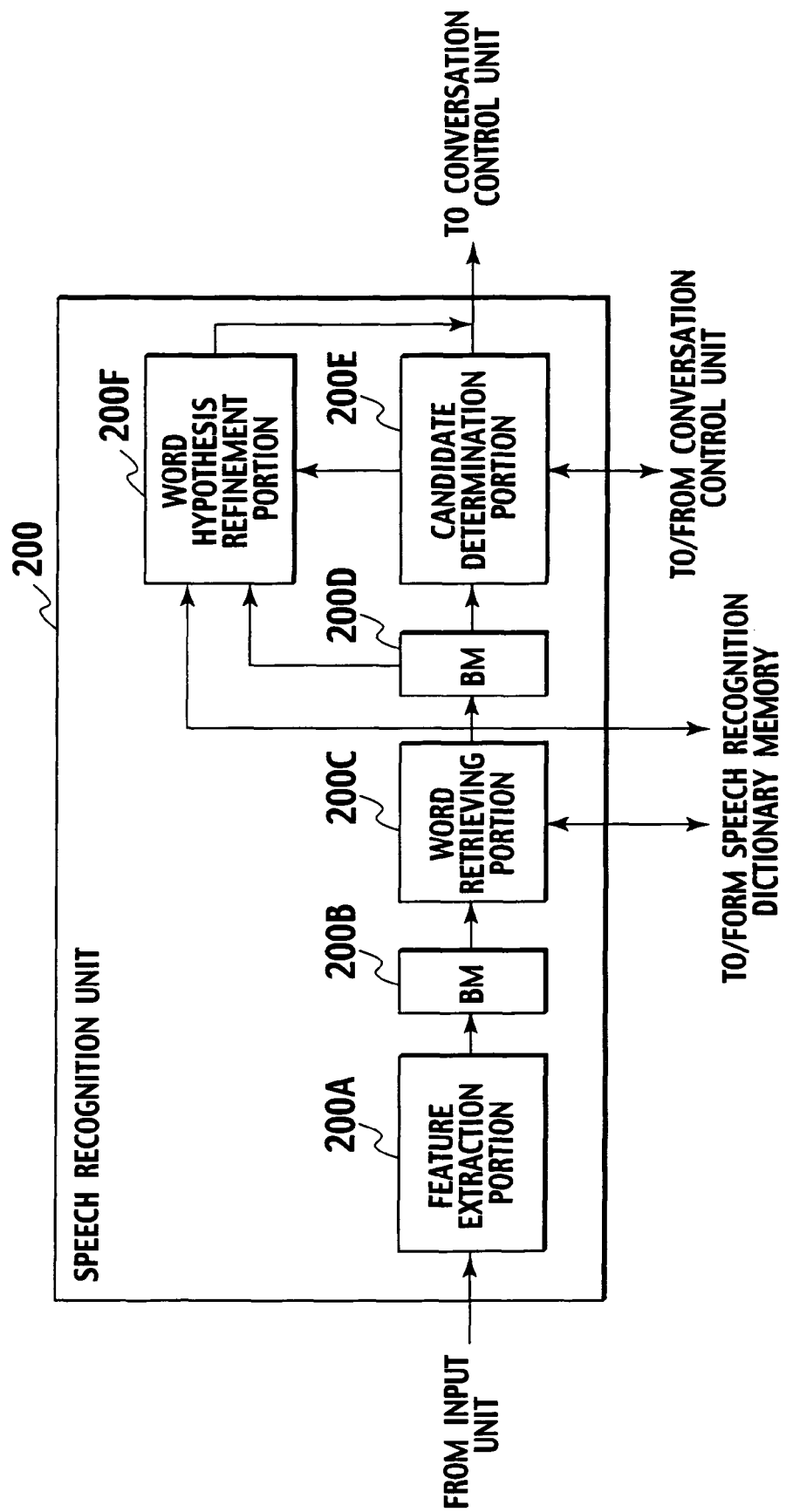
FIG. 2 is a block diagram of a speech recognition unit according to the first exemplary embodiment of the present invention.

As shown in FIG. 2, the speech recognition unit 200 comprises a feature extraction portion 200A, a buffer memory (BM) 200B, a word retrieving portion 200C, a buffer memory (BM) 200D, a candidate determination portion 200E and a word hypothesis refinement portion 200F. The word retrieving portion 200C and the word hypothesis refinement portion 200F are connected to the speech recognition dictionary memory 700. The candidate determination portion 200E is connected to the conversation database 500 via the conversation control unit 300.

The speech recognition dictionary memory 700 stores a phoneme hidden markov model (phoneme HMM) therein. The phoneme HMM has various states which each includes the following information: (a) a state number; (b) an acceptable context class; (c) lists of a previous state and a subsequent state; (d) a parameter of an output probability distribution density; and (e) a self-transition probability and a transition probability to a subsequent state. In the exemplary embodiment, the phoneme HMM is generated by converting a prescribed speaker mixture HMM, in order to identify which speakers respective distributions are derived from. An output probability distribution function has a mixture Gaussian distribution which includes a 34-dimensional diagonal covariance matrix. The speech recognition dictionary memory 700 further stores a word dictionary therein. Each symbol string which represents how to read a word every word in the phoneme HMM is stored in the word dictionary.

A speech of a speaker is input into the feature extraction portion 200A after being input into a microphone and then converted into a speech signal. The feature extraction portion 200A extracts a feature parameter from the speech signal and then outputs the feature parameter into the buffer memory 200B after executing an A/D conversion for the input speech signal. We can propose various methods for extracting the feature parameter. For example, the feature extraction portion 200A executes an LPC analysis to extract a 34-dimensional feature parameter which includes a logarithm power, a 16-dimensional cepstrum coefficient, a Alogarithm power and a 16-dimensional Δ cepstrum coefficient. The aging extracted feature parameter is input into the the word retrieving portion 200C via the buffer memory 200B.

The word retrieving portion 200C retrieves word hypotheses by using a one-pass Viterbi decoding method, based on the feature parameter input from the feature extraction portion 200A and the phoneme HMM and the word dictionary stored in the speech recognition dictionary memory 700, and then calculates likelihoods. The word retrieving portion 200C calculates a likelihood in a word and a likelihood from the launch of a speech every a state of the phoneme HMM at each time. More specifically, the likelihoods are calculated every an identification number of the associated word, a speech launch time of the associated word, and a previous word uttered before the associated word is uttered. The word retrieving portion 200C may exclude a word hypothesis having the lowest likelihood among the calculated likelihoods to reduce a computer throughput. The word retrieving portion 200C outputs the retrieved word hypotheses, the likelihoods associated with the retrieved word hypotheses, and information (e.g. frame number) regarding a time when has elapsed after the speech launch time, into the candidate determination portion 200E and a word hypothesis refinement portion 200F via the buffer memory 200D.

The candidate determination portion 200E compares the retrieved word hypotheses with topic identification information in a prescribed discourse space, with reference to the conversation control unit 300, and then determines whether or not there is one word hypothesis which coincides with the topic identification information among the retrieved word hypotheses. If there is the one word hypothesis, the candidate determination portion 200E outputs the one word hypothesis as a recognition result to the conversation control unit 300. If there is not the one word hypothesis, the candidate determination portion 200E requires the word hypothesis refinement portion 200F to carry out a refinement of the retrieved word hypotheses.

An operation of the candidate determination portion 200E will be described. We assume the following matters: (a) the word retrieving portion 200C outputs a plurality of word hypotheses ("KANTAKU (reclamation)", "KATAKU (excuse)" and "KANTOKU (movie director)") and a plurality of likelihoods (recognition rates) respectively associated with the plurality of word hypoteses into the candidate determination portion 200E; (b) the prescribed discourse space is a space regarding a movie; (c) the topic identification information includes "KANTOKU (movie director)"; (d) the likelihood of "KANTAKU (reclamation)" has the highest value among the plurality of likelihoods; and (e) the likelihood of "KANTOKU (movie director)" has the lowest value among the plurality of likelihoods.

The candidate determination portion 200E compares the retrieved word hypotheses with topic identification information in a prescribed discourse space, and then determines that one word hypotesis "KANTOKU (movie director)" coincides with the topic identification information. The candidate determination portion 200E outputs the one word hypotesis "KANTOKU (movie director)" as a recognition result to the conversation control unit 300. Due to such process, the word hypotesis "KANTOKU (movie director)" associated with the topic "movie" which a speaker currently utters is preferentially-selected over another word hypoteses "KANTAKU (reclamation)" and "KATAKU (excuse)" of which the likelihoods have higher values than the likelihood of "KANTOKU (movie director)". As a result, the candidate determination portion 200E can output the recognition result in the context of the discourse.

On the other hand, if there is not the one word hypothesis, the candidate determination portion 200E requires the word hypothesis refinement portion 200F to carry out a refinement of the retrieved word hypotheses. The word hypothesis refinement portion 200F refers to a statistical language model stored in the speech recognition dictionary memory 700 based on the retrieved word hypotheses output from the word retrieving portion 200C via the buffer memory 200D, and then carries out the refinement of the reterived word hypotheses such that one word hypothesis is selected from among word hypotheses for the same words which speakers start uttering at a different speech launch time and finish uttering at the same speech termination time. The one word hypothesis has the highest likelihood among likelihoods which are calculated from the different speech launch time to the same speech termination time every a head phonemic context of each associated same word. In the exemplary embodiment, we define the head phonemic context which indicates three phonemes string including an end phoneme of a word hypothesis for a word preceding the associated same word and the first and second phonemes of a word hypothesis for the associated same word. After the refinement, the word hypothesis refinement portion 200F outputs one word string for a word hypothesis having the highest likelihood among word strings for all refined word hypotheses as a recognition result to the conversation control unit 300.

Figure 3:
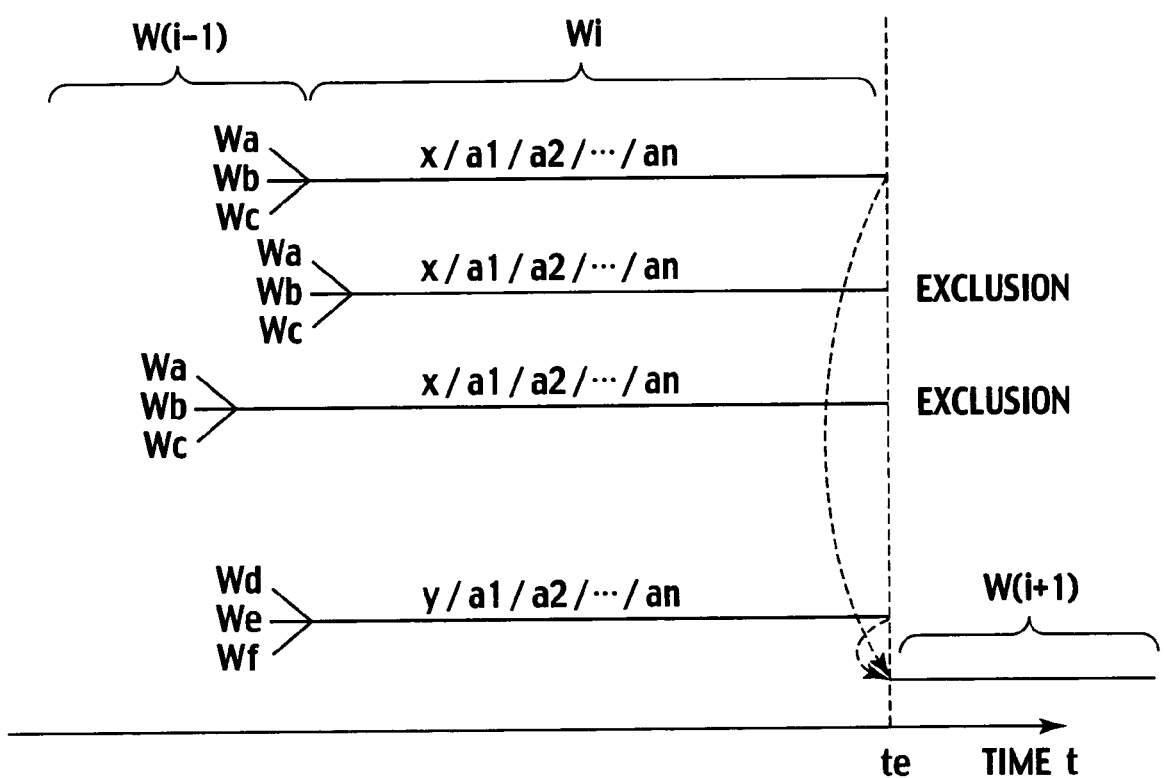
FIG. 3 is a timing chart of a process of a word hypothesis refinement portion according to the first exemplary embodiment of the present invention.

A word refinement process executed by the word hypothesis refinement portion 200F will be described with reference to FIG. 3.

We assume that there are six hypotheses Wa, Wb, Wc, Wd, We, Wf as a word hypothesis of the (i−1)-th word W(i−1) and there is the i-th word Wi consisting of a phonemic string a1, a2, ..., an, wherein the i-th word Wi follows the (i−1)-th word W(i−1). We further assume that end phonemes of the former three hypotheses Wa, Wb, Wc and the latter three hypotheses Wd, We, Wf are identical to end phonemes "x", "y", respectively. If there are three hypotheses having three preceded hypotheses Wa, Wb, Wc and one hypothesis having three preceded hypotheses Wd, We, Wf at the same speech termination time te, the word hypothesis refinement portion 200F selects one hypothesis having the highest likelihood from among the former three hypotheses having the same head phonemic contexts one another, and then excludes another two hypotheses.

In the above example, the word hypothesis refinement portion 200F does not exclude the latter one hypothesis because the head phonemic context of the latter one hypothesis differs from the head phonemic contexts of the former three hypotheses, that is, the end phoneme "y" of the preceded hypothesis for the latter one hypothesis differs from the end phonemes "x" of the preceded hypotheses for the former three hypotheses. The word hypothesis refinement portion 200F leaves one hypothesis every an end phoneme of a preceded hypothesis.

We may define the head phonemic context which indicates plural phonemes string including an end phoneme of a word hypothesis for a word preceding the associated same word, a phoneme string, which includes at least one phoneme, of the word hypothesis for the word preceding the associated same word, and a phoneme string, which includes the first phoneme, of the word hyothesis for the associated same word.

The feature extraction portion 200A, the word retrieving portion 200C, the candidate determination portion 200E and the word hypothesis refinement portion 200F each is composed of a computer such as a microcomputer. The buffer memories 200B, 200D and the speech recognition dictionary memory 700 each is composed of a memory unit such as a hard disk.

In the exemplary embodiment, instead of carrying out a speech recognition by using the word retrieving portion 200C and the word hypothesis refinement portion 200F, the speech recognition unit 200 may be composed of a phoneme comparison portion configured to refer to the phoneme HMM and a speech recognition portion configured to carry out the speech recognition by referring to the statistical language model according to a One Pass DP algorithm.

In the exemplary embodiment, instead of the speech recognition unit 200, the conversation database 500 and the speech recognition dictionary memory 700 constituting a part of the conversation controller 1, these elements may constitute a speech recognition apparatus which is independent from the conversation controller 1.

(1-1-2-2. Operation of Speech Recognition Unit)

Figure 4:
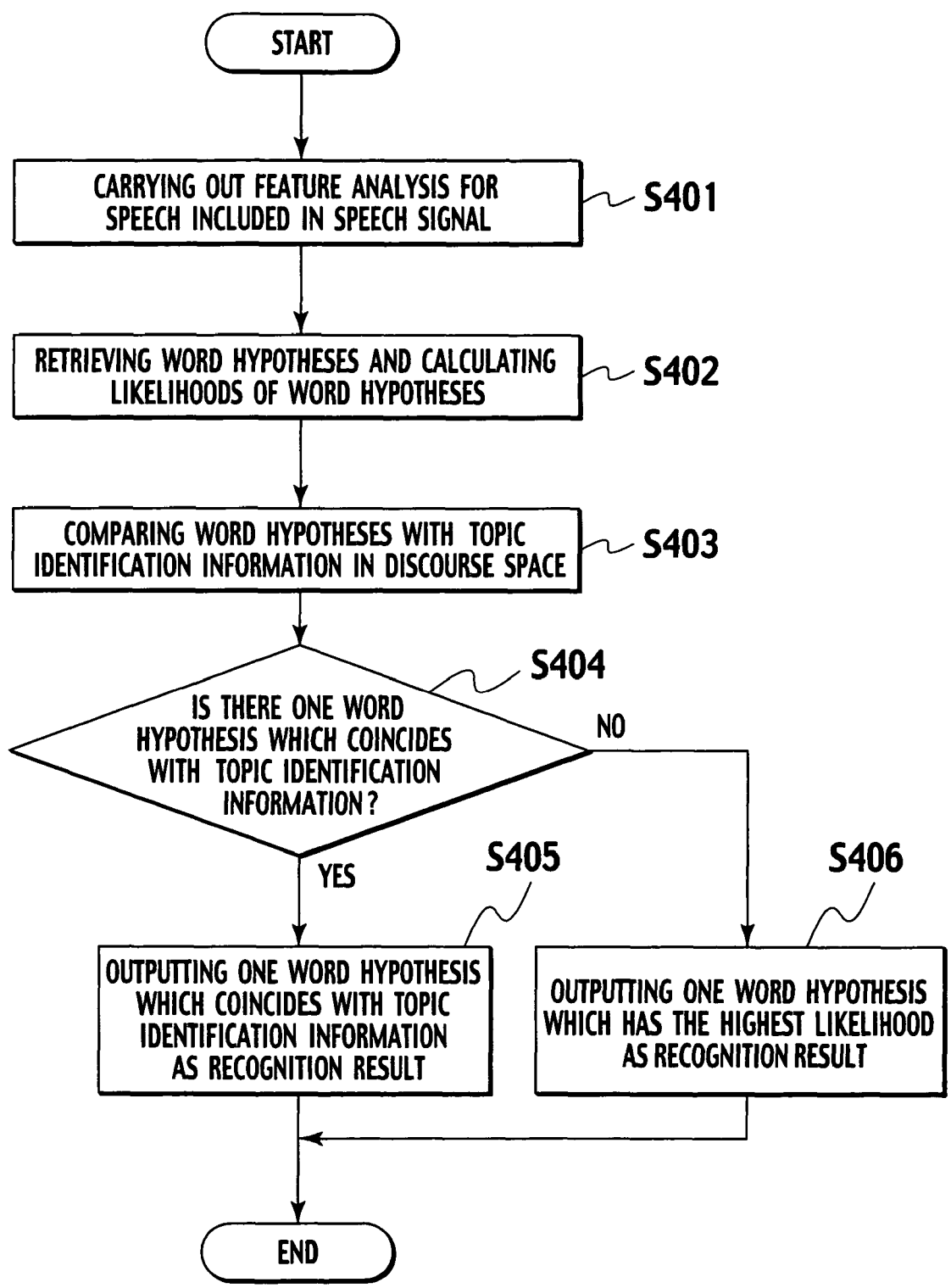
FIG. 4 is a flow chart of an operation of the speech recognition unit according to the first exemplary embodiment of the present invention.

An operation of the speech recognition unit 200 will be described with reference to FIG. 4.

In step S401, when the speech recognition unit 200 receives the speech signal from the input unit 100, it carries out a feature analysis for a speech included in the received speech signal to generate a feature parameter. In step S402, the speech recognition unit 200 compares the generated feature parameter with the phoneme HMM and the language model stored in the speech recognition dictionary memory 700, and then retrieves a certain number of word hypotheses and calculates likelihoods of the word hypotheses. In step S403, the speech recognition unit 200 compares the retrieved word hypotheses with the topic identification information in the prescribed discourse space. In step S404, the speech recognition unit 200 determines whether or not there is one word hypothesis which coincides with the topic identification information among the retrieved word hypotheses. If there is the one word hypothesis, the speech recognition unit 200 ouputs the one word hypothesis as the recognition result to the conversation control unit 300 (step S405). If there is not the one word hypothesis, the speech recognition unit 200 outputs one word hypothesis having the highest likelihood as the recognition result to the conversation control unit 300, according to the calculated likelihoods of the word hypotheses (step S406).

(1-1-3. Speech Recognition Dictionary Memory)

The speech recognition dictionary memory 700 stores character strings corresponding to standard speech signals therein. Upon the comparison, the speech recognition unit 200 identifies a word hypothesis for a character string corresponding to the received speech signal, and then outputs the identified word hypothesis as a charater string signal (recognition result) to the conversation control unit 300.

(1-1-4. Sentence Analyzing Unit)

A configuration of the sentence analyzing unit 400 will be described with reference to FIG. 5.

The sentence analyzing unit 400 analyses a character string identified at the input unit 100 or the speech recognition unit 200. The sentence analyzing unit 400 comprises a character string identifying portion 410, a morpheme extracting portion 420, a morpheme database 430, an input type determining portion 440 and an utterance type database 450. The character string identifying portion 410 divides a character string identified at the input unit 100 or the speech recognition unit 200 into segments. A segment means a sentence resulting from dividing a character string as much as possible to the extent of not breaking the grammatical meaning. Specifically, when a character string includes a time interval exceeding a certain level, the character string identifying portion 410 divides the character string at that portion. The character string identifying portion 410 outputs the resulting character strings to the morpheme extracting portion 420 and the input type determining portion 440. A "character string" to be described below means a character string of a sentence.

(1-1-4-1. Morpheme Extracting Unit)

Based on a character string of a sentence resulting from division at the character string identifying portion 410, the morpheme extracting portion 420 extracts, from the character string of the sentence, morphemes constituting minimum units of the character string, as first morpheme information. In the exemplary embodiment, a morpheme means a minimum unit of a word structure shown in a character string. Minimum units of the word structure may be parts of speech including a noun, an adjective and a verb, for example.

In the exemplary embodiment, as shown in FIG. 6, the morpheme are indicated at m1, m2, m3, . . . . More specifically, when receiving a character string from the character string identifying portion 410, the morpheme extracting portion 420 compares the received character string with a morpheme group stored in the morpheme database 430 (the morpheme group is prepared as a morpheme dictionary in which a direction word, a reading and a part of speech are described every morpheme which belongs to respective parts of speech). Upon the comparison, the morpheme extracting portion 420 extracts, from the character string, morphemes (m1, m2, . . . ) matching some of the stored morpheme group. Morphemes (n1, n2, n3, . . . ) other than the extracted morphemes may be auxiliary verbs, for example.

The morpheme extracting portion 420 outputs the extracted morpheme as the first morpheme information to a topic identification information retrieval portion 350. It is noted that the first morpheme information need not be structured. In the exemplary embodiment, a structuring means classifying and arranging morphemes included in a character string based on parts of speech. For example, a character string is divided into morphemes, and then the morphemes are arranged in a prescribed order such as a subject, an object and a predicate. The exemplary embodiment is realized even if structured first morpheme information is employed.

(1-1-4-2. Input Type Determining Unit)

The input type determining portion 440 determines the type of contents of the utterance (the type of utterance), based on the character string identified at the character string identifying portion 410. In the exemplary embodiment, the type of utterance is information for identifying the type of contents of the utterance and means one of the "types of uttered sentences" shown in FIG. 7, for example.

In the exemplary embodiment, the "types of uttered sentences" include declarative sentences (D: Declaration), time sentences (T: Time), locational sentences (L: Location), negational sentences (N: Negation) and the like, as shown in FIG. 7. The sentences of these types are formed in affirmative sentences or interrogative sentences. A declarative sentence means a sentence showing the opinion or idea of a user. In the exemplary embodiment, the sentence "I like Sato" as shown in FIG. 7 is an affirmative sentence, for example. A locational sentence means a sentence including an idea of location. A time sentence means a sentence including an idea of time. A negational sentence means a sentence to negate a declarative sentence. Illustrative sentences of the "types of uttered sentences" are shown in FIG. 7.

In the exemplary embodiment, when the input type determining portion 440 determines the "type of an uttered sentence", the input type determining portion 440 uses a declarative expression dictionary for determining that it is a declarative sentence, a negational expression dictionary for determining that it is a negational sentence, and the like, as shown in FIG. 8. Specifically, when receiving a character string from the character string identifying portion 410, the input type determining portion 440 compares the received character string with the dictionaries stored in the utterance type database 450, based on the character string. Upon the comparison, the input type determining portion 440 extracts elements relevant to the dictionaries from the character string.

Based on the extracted elements, the input type determining portion 440 determines the "type of the uttered sentence". When the character string includes elements declaring an event, for example, the input type determining portion 440 determines that the character string including the elements is a declarative sentence. The input type determining portion 440 outputs the determined "type of the uttered sentence" to a reply retrieval portion 380.

(1-1-5. Conversation Database)

A structure of data stored in the conversation database 500 will be described with reference to FIG. 9.

Figure 9:
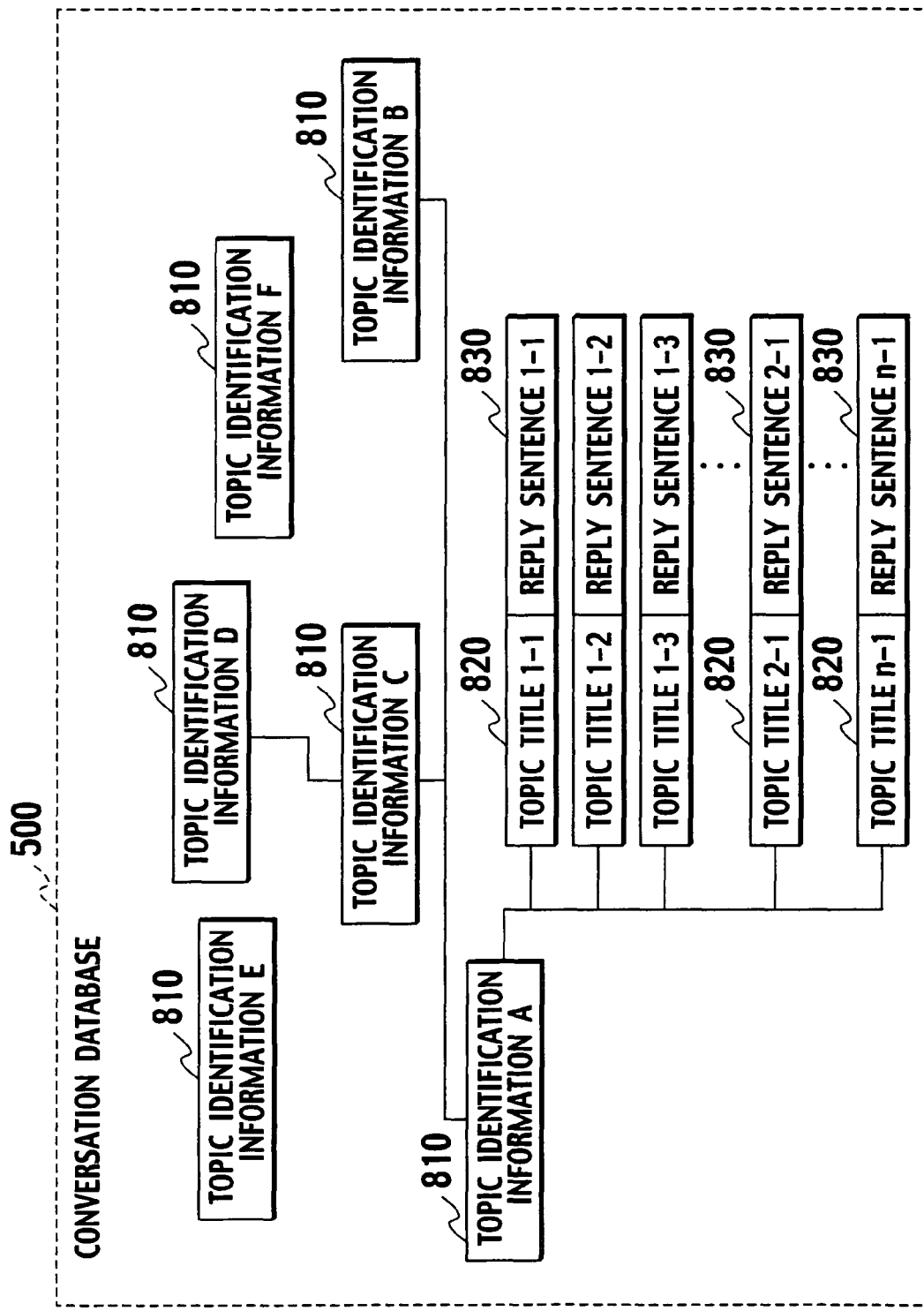
FIG. 9 is a diagram illustrating details of a hierarchical structure built in a conversation database according to the first exemplary embodiment of the present invention.

As shown in FIG. 9, the conversation database 500 stores a plurality of pieces of topic identification information 810 for identifying the topic of conversation. Each piece of topic identification information 810 is associated with another piece of topic identification information 810. For example, if a piece of topic identification information C (810) is identified, three pieces of topic identification information A (810), B (810), D (810) associated with the piece of topic identification information C (810) are also identified.

In the exemplary embodiment, a piece of topic identification information means a keyword relevant to contents to be input from a user or a reply sentence to be output to a user.

Each piece of topic identification information 810 is associated with one or more topic titles 820. Each topic title 820 is composed of one character, a plurality of character strings, or morphemes formed by combining these. Each topic title 820 is associated with a reply sentence 830 to be output to a user. A plurality of reply types each indicating a type of the reply sentence 830 are associated with the reply sentences 830, respectively.

An association between one piece of topic identification information 810 and another piece of topic identification information 810 will be described. In the exemplary embodiment, an association between information X and information Y means that, if the information X is read out, the information Y associated with the information X can be readout. For example, a state in which information (e.g. a pointer that indicates an address in which the information Y is stored, a physical memory address in which the information Y is stored, or a logical address in which the information Y is stored) for reading out the information Y is stored in data of the information X is called "the information Y is associated with the information X".

In the exemplary embodiment, as shown in FIG. 10, each piece of topic identification information is stored in a clear relationship as a superordinate concept, a subordinate concept, a synonym or an antonym (not shown) to another piece of topic identification information. For example, topic identification information 810B (amusement) as a superordinate concept to topic identification information 810A (movie) is associated with the topic identification information 810A and stored in an upper level than the topic identification information 810A (movie).

Also, topic identification information $810C_1$ (movie director), topic identification information $810C_2$ (leading actor), topic identification information $810C_3$ (distribution company), topic identification information $810C_4$ (screen time), topic identification information $810D_1$ (Seven Samurai), topic identification information $810D_2$ (Ran), topic identification information $810D_3$ (Yojimbo), . . . , as a subordinate concept to the topic identification information 810A (movie) are associated with the topic identification information 810A (movie) and stored in a lower level than the topic identification information 810A (movie).

A synonym 900 is associated with the topic identification information 810A (movie). For example, the synonym 900

(work, contents, cinema) is stored as a synonym of a keyword "movie" of the topic identification information 810A. Thereby, in a case where the keword "movie" is not included in an utterance, if at least one of the keywords "work", "contents", "cinema" is included in the utterance, the conversation controller 1 can treat the topic identification information 810A as topic identification information included in the utterance.

When the conversation controller 1 identifies the topic identification information 810, the conversation controller 1 can retrieve and extract another topic identification information 810 associated with the identified topic identification information 810 and the topic titles 820 or the reply sentences 830 of topic identification information 810, at hight speed, with reference to the stored contents of the conversation database 500.

A structure of data of the topic title 820 will be described with reference to FIG. 11.

The topic identification information 810D$_1$, the topic identification information 810D$_2$, the topic identification information 810D$_3$, . . . , include topic titles 820$_1$, 820$_2$, . . . , topic titles 820$_3$, 820$_4$, . . . , topic titles 820$_5$, 820$_6$, . . . , respectively. In the exemplary embodiment, as shown in FIG. 11, each topic title 820 is composed of first identification information 1001, second identification information 1002 and third identification information 1003. The first identification information 1001 means a main morpheme constituting a topic. The first identification information 1001 may be a subject of a sentence, for example. The second identification information 1002 means a morpheme having a close relevance to the first identification information 1001. The second identification information 1002 may be an object, for example. The third identification information 1003 means a morpheme showing a movement of an object or a morpheme modifying a noun or the like. The third identification information 1003 may be a verb, an adverb or an adjective, for example. It is noted that the first identification information 1001, the second identification information 1002 and the third identification information 1003 may have another meanings (another parts of speech) even if contents of a sentence are understood from these pieces of identification information.

As shown in FIG. 11, when the subject is "Seven Samurai", and the adjective is "interesting", for example, the topic title 820$_2$ (second morpheme information) consists of the morpheme "Seven Samurai" included in the first identification information 1001 and the morpheme "interesting" included in the third identification information 1003. It is noted that "*" is shown in the second identification information 1002 because the topic title 820$_2$ includes no morpheme in an item of the second identification information 1002.

The topic title 820$_2$ (Seven Samurai; *; interesting) has the meaning that "Seven Samurai is interesting". Included in the parenthesis of a topic title 820$_2$ are the first identification information 1001, the second identification information 1002 and the third identification information 1003 in this order from the left, below. When a topic title 820 includes no morpheme in an item of identification information, "*" is shown in that portion.

It is noted that the identification information consititution the topic title 820 may have another identification information (e.g. fourth identification information).

The reply sentence 830 will be described with reference to FIG. 12. As shown in FIG. 12, the reply sentences 830 are classified into different types (types of response) such as declaration (D: Declaration), time (T: Time), location (L: Location) and negation (N: Negation), in order to make a reply suitable for the type of an uttered sentence provided by a user. An affirmative sentence is indicated at "A" and an interrogative sentence is indicated at "Q".

A structure of data of the topic identification information 810 will be described with reference to FIG. 13. As shown in FIG. 13, the topic identification information 810 "Sato" is associated with a plurality of topic titles (820) 1-1, 1-2, . . . . The topic titles (820) 1-1, 1-2, . . . are associated with reply sentences (830) 1-1, 1-2, . . . , respectively. The reply sentence 830 is prepared every type of response.

When the topic title (820) 1-1 is (Sato; *; like) {these are extracted morphemes included in "I like Sato"}, for example, the reply sentence (830) 1-1 associated with the topic title (820) 1-1 include (DA: the declarative affirmative sentence "I like Sato too") and (TA: the time affirmative sentence "I like Sato at bat"). The reply retrieval portion 380 to be described below retrieves one of the reply sentences 830 associated with the topic title 820, with reference to an output from the input type determining portion 440.

Each piece of next plan designation information 840 is associated with each reply sentence 830. The next plan designation information 840 is information for designating a reply sentence (hereinafter called next reply sentence) to be preferentially output in response to a user utterance. If the next plan designation information 840 is information for identifying the next reply sentence, we can define any information as the next plan designation information 840. For example, a reply sentence ID for identifying at least one of all reply sentences stored in the conversation database 500 is defined as the next plan designation information 840.

In the exemplary embodiment, the next plan designation information 840 is described as the information (e.g. reply sentence ID) for identifying the next reply sentence by reply sentence. However, the next plan designation information 840 may be information for identifying the next reply sentence by topic identification information 810 and the topic titles 820. For example, a topic identification information ID and a topic title ID are defined as the next plan designation information 840. In this case, the next reply sentence is called a next reply sentence group because a plurality of reply sentences are designated as the next reply sentence. Any reply sentence included in the next reply sentence group is output as a reply sentence.

(1-1-6. Conversation Control Unit)

A configuration of the conversation control unit 300 will be described with reference to FIG. 5.

The conversation control unit 300 controls a data passing between configuration elements (the speech recognition unit 200, the sentence analyzing unit 400, the conversation database 500, the output unit 600 and the speech recognition dictionary memory 700) in the conversation controller 1, and has a function for determining and outputting a reply sentence in response to a user utterance.

Figure 5:
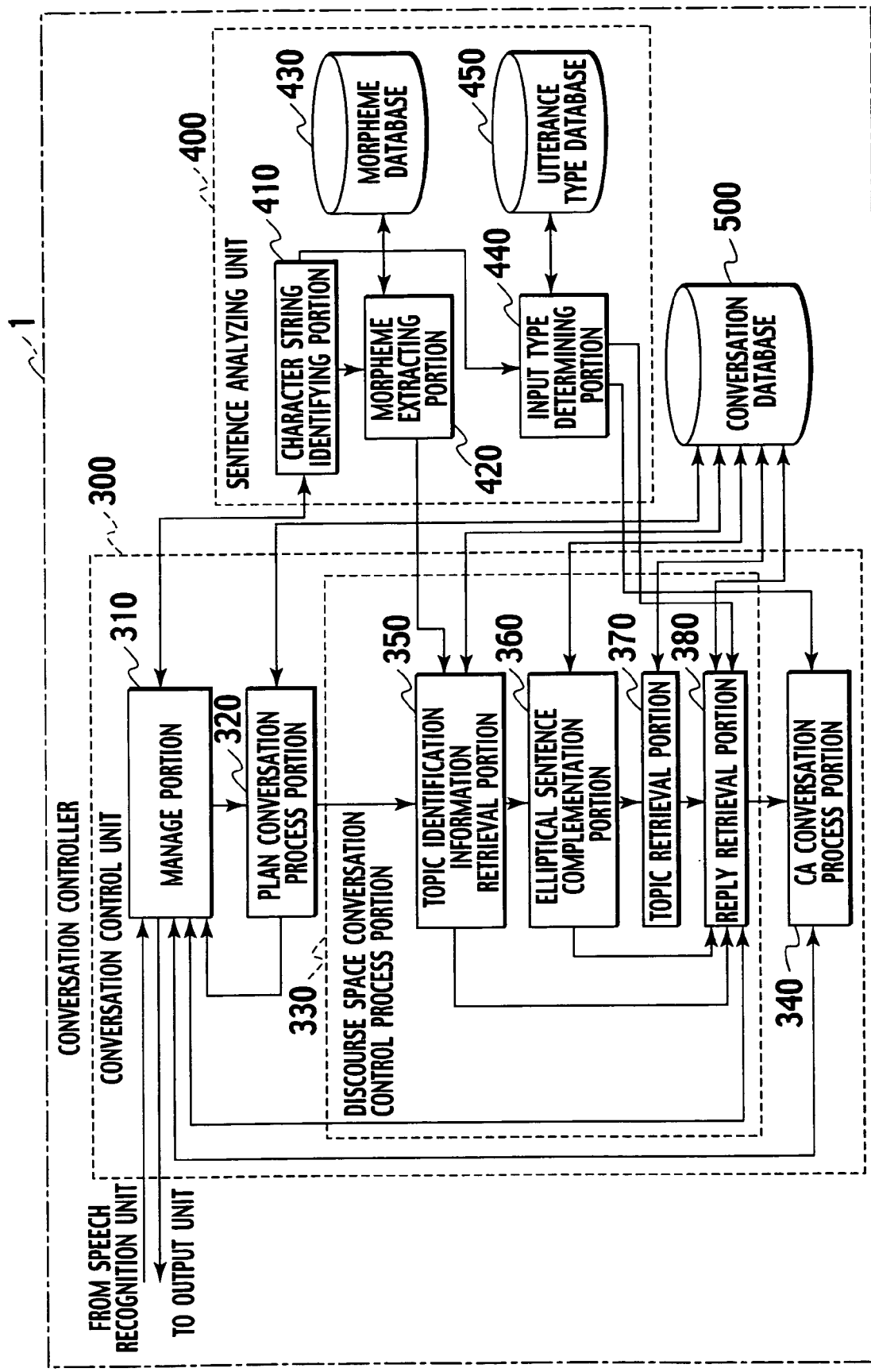
FIG. 5 is a partly enlarged block diagram of the conversation controller according to the first exemplary embodiment of the present invention.

As shown in FIG. 5, the conversation control unit 300 comprises a manage portion 310, a plan conversation process portion 320, a discourse space conversation control process portion 330 and a CA conversation process portion 340.

(1-1-6-1. Manage Portion)

The manage portion 310 stores a discourse history and has a function for updating the discourse history. The manage portion 310 further has a function for sending a part or a whole of the discourse history to a topic identification information retrieval portion 350, an elliptical sentence complementation portion 360, a topic retrieval portion 370 and/or a reply retrieval portion 380, according to a demand from the topic identification information retrieval portion 350, the elliptical sentence complementation portion 360, the topic retrieval portion 370 and/or the reply retrieval portion 380.

(1-1-6-2. Plan Conversation Process Portion)

The plan conversation process portion 320 executes a plan and has a function for establishing a conversation between a user and the conversation controller 1 according to the plan. It is noted that the plan means providing a predetermined reply following a predetermined order to a user.

The plan conversation process portion 320 further has a function for outputting the predetermined reply following the predetermined order, in response to a user utterance.

Figure 14:
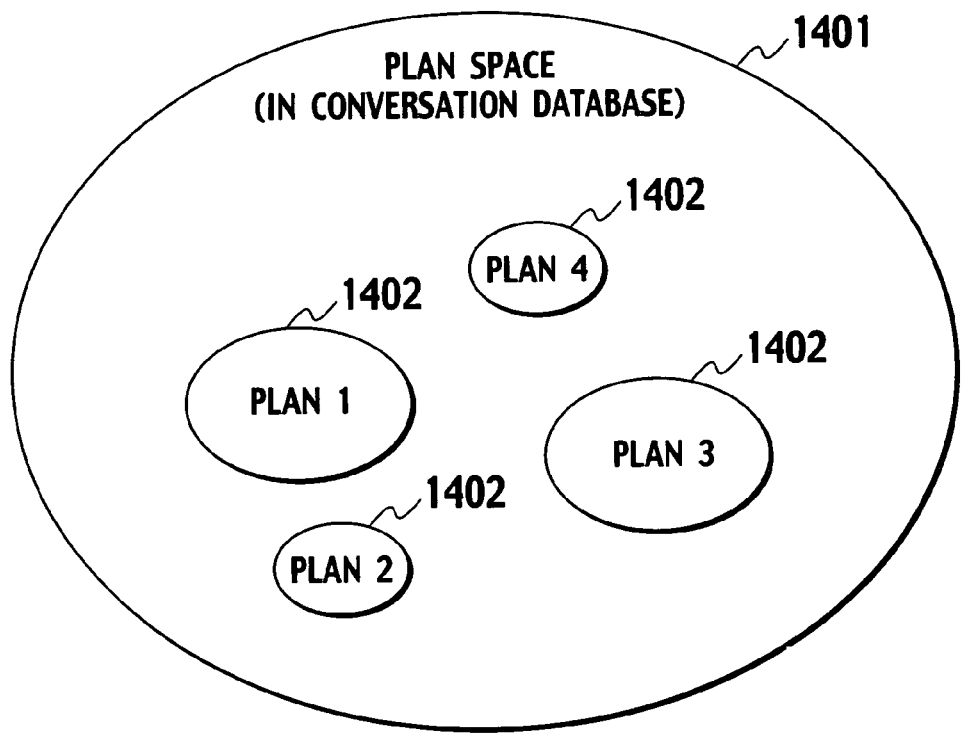
FIG. 14 is a diagram illustrating a plan space according to the first exemplary embodiment of the present invention.

As shown in FIG. 14, a plan space 1401 includes a plurality of plans 1402 (plans 1, 2, 3, 4) therein. The plan space 1401 is a set of the plurality of plans 1402 stored in the conversation database 500. The conversation controller 1 selects one plan 1402 previously defined to be used at a time of starting up the conversation controller 1 or starting a conversation, or arbitrarily selects any plan 1402 among the plan space 1401 in response to contents of each user uttarance. Then, the conversation controller 1 outputs a reply sentence corresponding to the user utterance by using the selected plan 1402.

Figure 15:
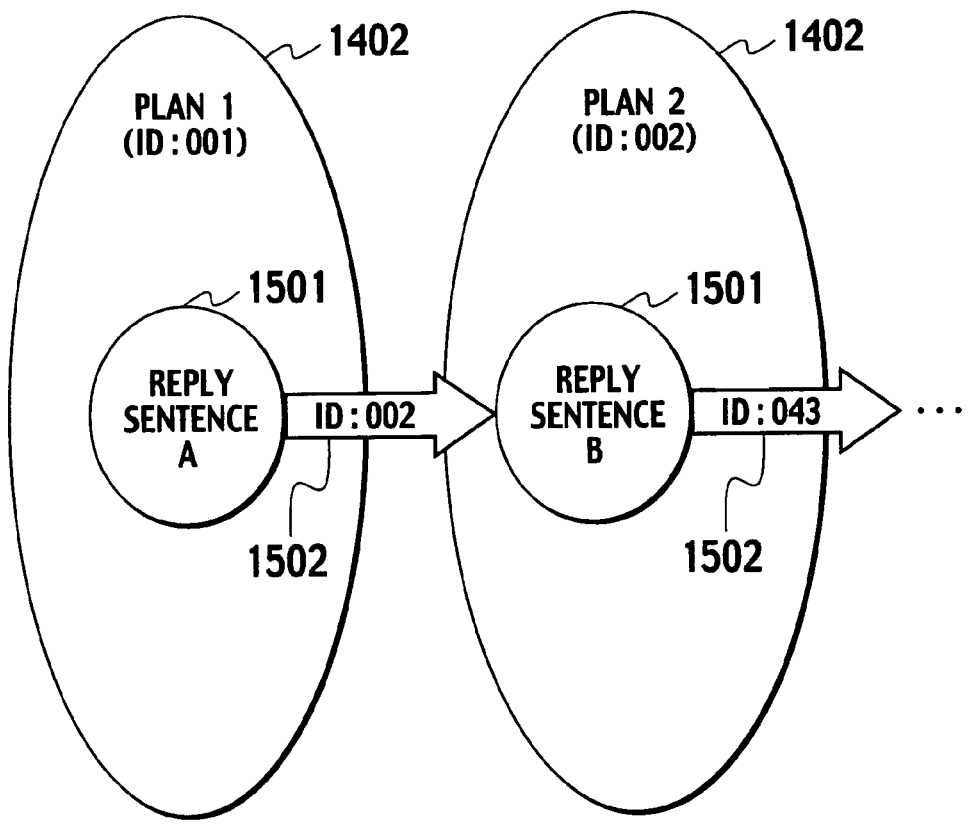
FIG. 15 is a diagram illustrating one example a plan transition according to the first exemplary embodiment of the present invention.
Figure 16:
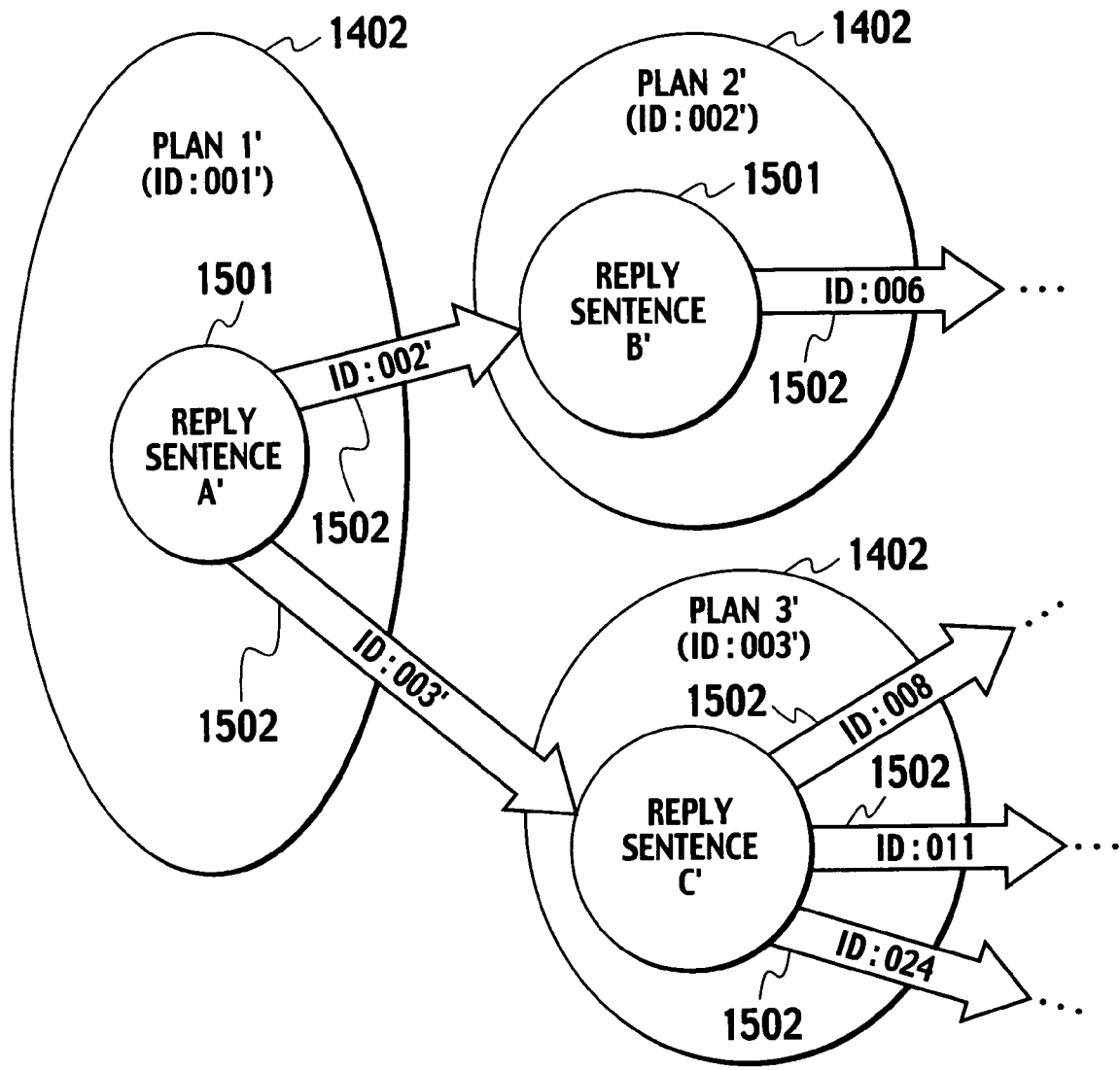
FIG. 16 is a diagram illustrating another example of the plan transition according to the first exemplary embodiment of the present invention.

As shown in FIG. 15, each plan 1402 includes a reply sentence 1501 and next plan designation information 1502 associated with the reply sentence 1501 therein. The next plan designation information 1502 is information for identifying one plan 1402 which includes one reply sentence (next candidate reply sentence) 1501 to be output to a user, following the reply sentence 1501 associated therewith. A plan 1 (1402) includes a reply sentence A (1501) which the conversation controller 1 outputs at a time of executing the plan 1, and next plan designation information 1502 associated with the reply sentence A (1501) therein. The next plan designation information 1502 is information (ID: 002) for identifying a plan 2 (1402) which includes a reply sentence B (1501) being a next candidate reply sentence for the reply sentence A (1501). In the same way, the plan 2 (1402) includes the reply sentence B (1501) and next plan designation information 1502 associated with the reply sentence B (1501) therein. The next plan designation information 1502 is information (ID: 043) for identifying another plan which includes another reply sentence being a next candidate reply sentence for the reply sentence B (1501).

Thus, the plans 1402 are linked one another via the next plan designation information 1502, which realizes a plan conversation in which a series of contents is output to a user. That is, it is possible to provide reply sentences to the user in order, in response to a user utterance, by dividing contents (an explanatory sentence, an announcement sentence, a questionnaire or the like) that one wishes to tell into a plurality of reply sentences and then preparing an order of the dividend reply sentences as a plan. It is noted that it is not necessary to immediately output to a user a reply sentence 1501 included in a plan 1402 designated by next plan designation information 1502, in response to a user utterance for a previous reply sentence. For example, the conversation controller 1 may output to the user the reply sentence 1501 included in the plan 1402 designated by the next plan designation information 1502, after having a conversation on a topic other than one of a current plan with the user.

The reply sentence 1501 shown in FIG. 15 corresponds to one of reply sentences 830 shown in FIG. 13. Also, the next plan designation information 1502 shown in FIG. 15 corresponds to the next plan designation information 840 shown in FIG. 13.

The link between the plans 1402 is limited to a one-dimensional array in FIG. 15. As show in FIG. 16, a plan 1' (1402) includes a reply sentence A' (1501) and two pieces (IDs: 002', 003') of next plan designation information 1502 respectively associated with two reply sentences B', C' (1501) included in the plans 2', 3' therein. The conversation controller 1 alternatively selects one of the reply sentences B', C' (1501) and finishes the plan 1' (1402) after outputting the reply sentence A' (1501) to a user. Thus, the link between the plans 1402 may be a tree-shaped array or a cancellous array.

Each plan 1402 has one or more pieces of next plan designation information 1502. It is noted that there may be no next plan designation information 1502 in a plan 1402 for an end of conversation.

Figure 17:
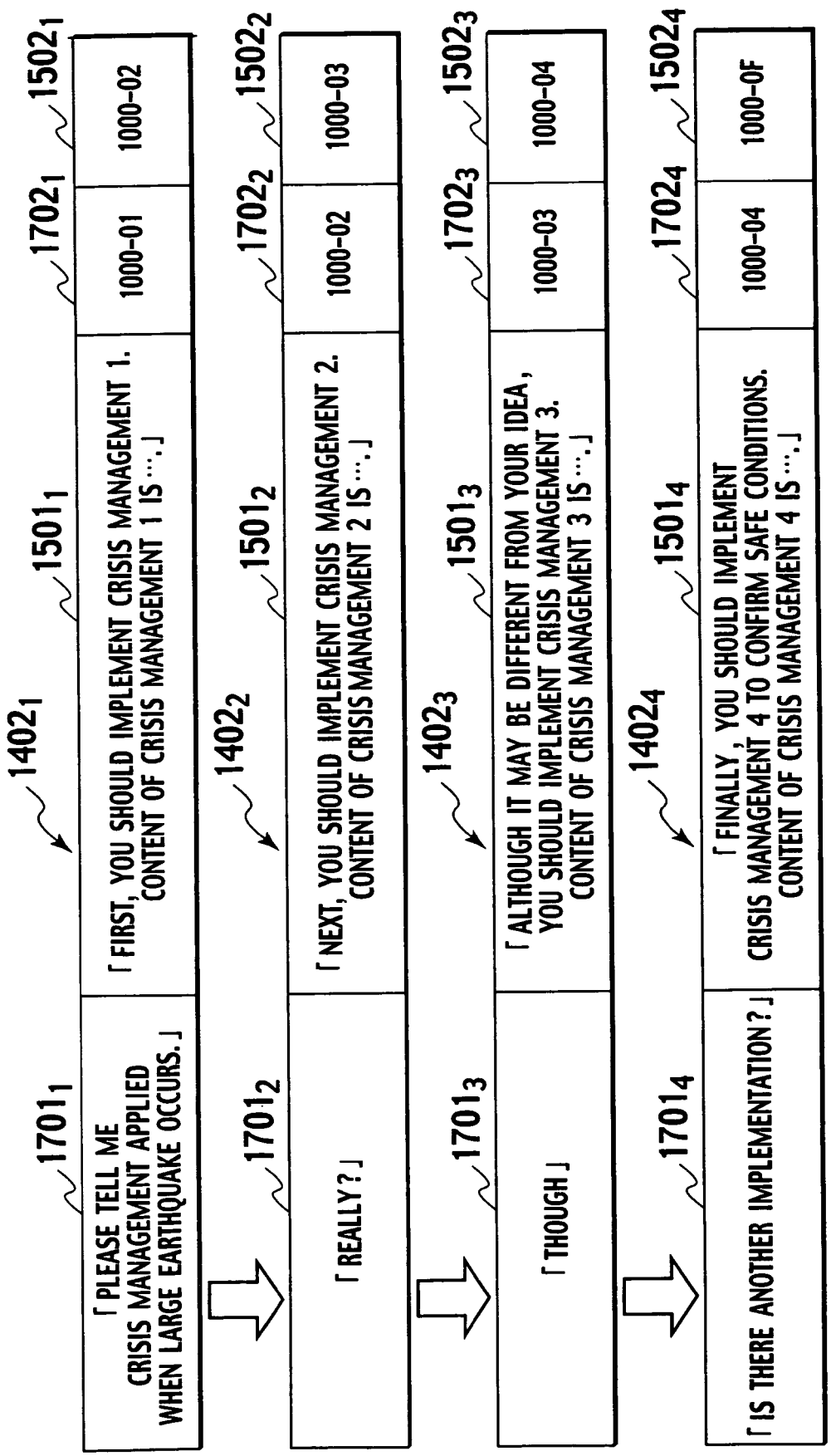
FIG. 17 is a diagram illustrating details of a plan conversation control process according to the first exemplary embodiment of the present invention.

As shown in FIG. 17, plans $1402_1$, $1402_2$, $1402_3$, $1402_4$ correspond to reply sentences $1501_1$, $1501_2$, $1501_3$, $1501_4$ for notifying a user of information on a crisis management, respectively. The reply sentences $1501_1$, $1501_2$, $1501_3$, $1501_4$ constitute a coherent sentence (explanatory sentence) as a whole. The plans $1402_1$, $1402_2$, $1402_3$, $1402_4$ include therein ID data $1702_1$, $1702_2$, $1702_3$, $1702_4$, which have values 1000-01, 1000-02, 1000-03, 1000-04, respectively. It is noted that a number below a hyphen of the ID data shows an output order of the associated plan. The plans $1402_1$, $1402_2$, $1402_3$, $1402_4$ further include therein next plan designation information $1502_1$, $1502_2$, $1502_3$, $1502_4$, which have values 1000-02, 1000-03, 1000-04, 1000-0F, respectively. A number "0F" below a hyphen of the next plan designation information $1502_4$ shows that the reply sentence $1501_4$ is an end of the coherent sentence because there is no plan to be output following the reply sentence $1501_4$.

In this example, if a user utterance is "please tell me a crisis management applied when a large earthquake occurs", the plan conversation process portion 320 starts to execute this series of plans. More specifically, when the plan conversation process portion 320 receives the user utterance "please tell me a crisis management applied when a large earthquake occurs", the plan conversation process portion 320 searches the plan space 1401 and checks whether or not there is the plan $1402_1$ which includes the reply sentence $1501_1$ corresponding to the user utterance. Here, a user utterance character string $1701_1$, included in the plan $1402_1$ corresponds to the user utterance "please tell me a crisis management applied when a large earthquake occurs".

If the plan conversation process portion 320 discovers the plan $1402_1$, the plan conversation process portion 320 retrieves the reply sentence $1501_1$, included in the plan $1402_3$. Then, the plan conversation process portion 320 outputs the reply sentence $1501_1$ as a reply for the user utterance and identifies a next candidate reply sentence with reference to the next plan designation information $1502_1$.

Next, when the plan conversation process portion 320 receives another user utterance via the input unit 100, a speech recognition unit 200 and the like after outputting the reply sentence $1501_1$, the plan conversation process portion 320 checks whether or not the reply sentence $1501_2$ included in the plan $1402_2$ which is designated by the next plan designation information $1502_1$ is output. More specifically, the plan conversation process portion 320 compares the received user utterance with a user utterance character string $1701_2$ or topic titles 820 (not shown in FIG. 17) associated with the reply sentence $1501_2$, and determines whether or not they are related to each other. If they are related to each other, the plan conversation process portion 320 outputs the reply sentence $1501_2$ as a reply for the user utterance and identifies a next candidate reply sentence with reference to the next plan designation information $1502_2$.

In the same way, the plan conversation process portion 320 transfers the plans $1402_3$, $1402_4$ according to a series of user utterances and outputs the reply sentences $1501_3$, $1501_4$. The plan conversation process portion 320 finishes a plan execution when the output of the reply sentence $1501_4$ is completed.

Thus, the plan conversation process portion 320 can provide conversation contents to a user in order previously defined by sequentially executing the plan $1402_1$, $1402_2$, $1402_3$, $1402_4$.

(1-1-6-3. Discourse Space Conversation Control Process Portion)

As shown in FIG. 5, the discourse space conversation control process portion 330 comprises the topic identification information retrieval portion 350, the elliptical sentence complementation portion 360, the topic retrieval portion 370 and the reply retrieval portion 380. The mangage portion 310 controls a whole of the conversation control unit 300.

The discourse history is information for identifying a topic or subject of conversation between a user and the conversation controller 1 and includes at least one of noted topic identification information, a noted topic title, user input sentence topic identification information and reply sentence topic identification information. The noted topic identification information, the noted topic title and the reply sentence topic identification information are not limited to information which is defined by the last conversation. They may be information which becomes them during a specified past period or an accumulated record of them.

(1-1-6-3-1. Topic Identification Information Retrieval Portion)

The topic identification information retrieval portion 350 compares the first morpheme information extracted at the morpheme extracting portion 420 with pieces of topic identification information, and retrieves a piece of topic identification information corresponding to a morpheme constituting part of the first morpheme information from the pieces of topic identification information. Specifically, when the first morpheme information received from the morpheme extracting portion 420 is two morphemes "Sato" and "like", the topic identification information retrieval portion 350 compares the received first morpheme information with the topic identification information group.

Upon the comparison, when the topic identification information group includes a morpheme constituting part of the first morpheme information (e.g. "Sato") as a noted topic title $820_{focus}$, the topic identification information retrieval portion 350 outputs the noted topic title $820_{focus}$ to the reply retrieval portion 380. Here, we use the reference number $820_{focus}$ in order to distinguish between a topic title 820 retrieved by the last time and another topic title 820. On the other hand, when the topic identification information group does not include the morpheme constituting the part of the first morpheme information as the noted topic title $820_{focus}$, the topic identification information retrieval portion 350 determines user input sentence topic identification information based on the first morpheme information, and outputs the received first morpheme information and the determined user input sentence topic identification information to the elliptical sentence complementation portion 360. Here, the user input sentence topic identification information means topic identification information corresponding to a morpheme that is relevant to contents about which a user talks or that may be relevant to contents about which the user talks among morphemes included in the first morpheme information.

(1-1-6-3-2. Elliptical Sentence Complementation Portion)

The elliptical sentence complementation portion 360 generates various kinds of complemented first morpheme information by complementing the first morpheme information, by means of topic identification information 810 retrieved by the last time (hereinafter called "noted topic identification information") and topic identification information 810 included in a previous reply sentence (hereinafter called "reply sentence topic identification information"). For example, if a user utterance is "like", the elliptical sentence complementation portion 360 adds the noted topic identification information "Sato" to the first morpheme information "like" and generates the complemented first morpheme information "Sato, like".

That is, with the first morpheme information as "W", and with a set of the noted topic identification information and the reply sentence topic identification information as "D", the elliptical sentence complementation portion 360 adds one or more elements of the set "D" to the first morpheme information "W" and generates the complemented first morpheme information.

In this manner, when a sentence constituted by use of the first morpheme information is an elliptical sentence and is unclear as Japanese, the elliptical sentence complementation portion 360 can use the set "D" to add one or more elements (e.g. Sato) of the set "D" to the first morpheme information "W". As a result, the elliptical sentence complementation portion 360 can make the first morpheme information "like" into the complemented first morpheme information "Sato, like". Here, the complemented first morpheme information "Sato, like" correspond to a user utterance "I like Sato".

That is, even if the contents of a user utterance constitute an elliptical sentence, the elliptical sentence complementation portion 360 can complement the elliptical sentence by using the set "D". As a result, even when a sentence composed of the first morpheme information is an elliptical sentence, the elliptical sentence complementation portion 360 can make the sentence into correct Japanese.

Based on the set "D", the elliptical sentence complementation portion 360 searches a topic title 820 which is related to the complemented first morpheme information. When the elliptical sentence complementation portion 360 discovers the topic title 820 which is related to the complemented first morpheme information, the elliptical sentence complementation portion 360 outputs the topic title 820 to reply retrieval portion 380. The reply retrieval portion 380 can output a reply sentence 830 best suited for the contents of a user utterance based on an appropriate topic title 820 searched at the elliptical sentence complementation portion 360.

The elliptical sentence complementation portion 360 is not limited to adding the set "D" to the first morpheme information. Based on the noted topic title, the elliptical sentence complementation portion 360 may add a morpheme included in any of the first identification information, second identification information and third identification information constituting the topic title to extracted first morpheme information.

(1-1-6-3-3. Topic Retrieval Portion)

When the elliptical sentence complementation portion 360 does not determine the topic title 820, the topic retrieval portion 370 compares the first morpheme information with topic titles 820 associated with the user input sentence topic identification information, and retrieves a topic title 820 best suited for the first morpheme information from among the topic titles 820.

More specifically, when the topic retrieval portion 370 receives a search command signal from the elliptical sentence complementation portion 360, the topic retrieval portion 370 retrieves a topic title 820 best suited for the first morpheme information from among topic titles 820 associated with the user input sentence topic identification information, based on the user input sentence topic identification information and the first morpheme information included in the received search command signal. The topic retrieval portion 370 outputs the retrieved topic title 820 as a search result signal to the reply retrieval portion 380.

For example, as shown in FIG. 13, since the received first morpheme information "Sato, like" includes the topic identification information 810 "Sato", the topic retrieval portion 370 identifies the topic identification information 810 "Sato" and compares topic titles (820) 1-1, 1-2, ... associated with the topic identification information 810 "Sato" with the received first morpheme information "Sato, like".

Based on the result of the comparison, the topic retrieval portion 370 retrieves the topic title (820) 1-1 "Sato; *; like" which is identical to the received first morpheme information "Sato, like" from among the topic titles (820) 1-1, 1-2, .... The topic retrieval portion 370 outputs the retrieved topic title (820) 1-1 "Sato; *; like" as the serch result signal to the reply retrieval portion 380.

(1-1-6-3-4. Reply Retrieval Portion)

Based on the topic title 820 retrieved at the elliptical sentence complementation portion 360 or the topic retrieval portion 370, the reply retrieval portion 380 retrieves a reply sentence associated with the topic title. Also, based on the topic title 820 retrieved at the topic retrieval portion 370, the reply retrieval portion 380 compares different types of response associated with the topic title 820 with the type of utterance determined at the input type determining portion 440. Upon the comparison, the reply retrieval portion 380 retrieves a type of response which is identical to the determined type of utterance from among the types of response.

For example, as shown in FIG. 13, when a topic title retrieved at the topic retrieval portion 370 is the topic title 1-1 "Sato; *; like", the reply retrieval portion 380 identifies the type of response (DA) which is identical to the type of the uttered sentence (e.g. DA) determined at the input type determining portion 440, from among the reply sentence 1-1 (DA, TA and so on) associated with the topic title 1-1. Upon the identification of the type of response (DA), the reply retrieval portion 380 retrieves the reply sentence 1-1 "I like Sato too" associated with the identified type of response (DA), based on the type of response (DA).

Here, "A" in "DA", "TA" and so on means an affirmative form. When the types of utterance and the types of response include "A", affirmation of a certain matter is indicated. The types of utterance and the types of response can include the types of "DQ", "TQ" and so on. "Q" in "DQ", "TQ" and so on means a question about a matter.

When the type of response is in the interrogative form (Q), a reply sentence associated with this type of response is made in the affirmative form (A). A reply sentence created in the affirmative form (A) may be a sentence for replying to a question. For example, when an uttered sentence is "Have you ever operated slot machines?", the type of utterance of the uttered sentence is the interrogative form (Q). A reply sentence associated with the interrogative form (Q) may be "I have operated slot machines before" (affirmative form (A)), for example.

On the other hand, when the type of response is in the affirmative form (A), a reply sentence associated with this type of response is made in the interrogative form (Q). A reply sentence created in the interrogative form (Q) may be an interrogative sentence for asking back against the contents of an utterance or an interrogative sentence for finding out a certain matter. For example, when the uttered sentence is "I like playing slot machines", the type of utterance of this uttered sentence is the affirmative form (A). A reply sentence associated with the affirmative form (A) may be "Do you like playing pachinko?" (an interrogative sentence (Q) for finding out a certain matter), for example.

The reply retrieval portion 380 outputs the retrieved reply sentence 830 as a reply sentence signal to the management portion 310. Upon receiving the reply sentence signal from the reply retrieval portion 380, the management portion 310 outputs the received reply sentence signal to the output unit 600.

(1-1-6-4. CA Conversation Process Portion)

When the plan conversation process portion 320 or the discourse space conversation control process portion 330 does not determine a reply sentence for a user, the CA conversation process portion 340 outputs the reply sentence so that the conversation controller 1 can continue to talk with the user according to contents of a user utterance.

The configuration of the conversation controller 1 will be again described with reference to FIG. 1.

(1-1-7. Output Unit)

The output unit 600 outputs the reply sentence retrieved at the reply retrieval portion 380. The output unit 600 may be a speaker or a display, for example. Specifically, when receiving the reply sentence from the reply retrieval portion 380, the output unit 600 outputs the received reply sentence (e.g. I like Sato too) by voice, based on the reply sentence.

An operation of the conversation controller 1 will be described with reference to FIGS. 18 to 22.

Figure 18:
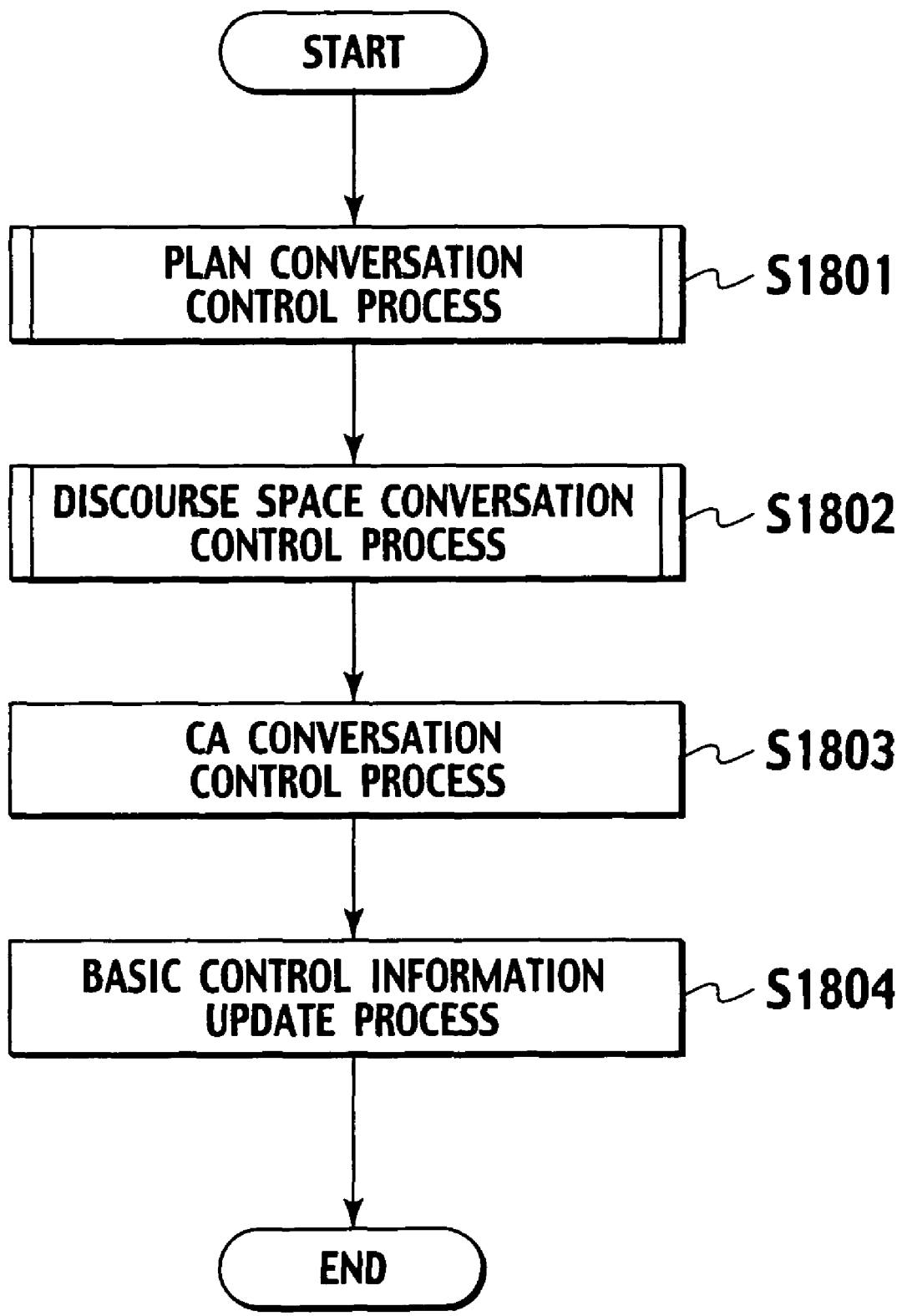
FIG. 18 is a flow chart of a main process in a conversation control unit according to the first exemplary embodiment of the present invention.

When the conversation control unit 300 receives a user utterance, a main process shown in FIG. 18 is executed. Upon executing the main process, a reply sentence for the received user utterance is output to establish a conversation (dialogue) between the user and the conversation controller 1.

In step S1801, the plan conversation process portion 320 executes a plan conversation control process. The plan conversation control process is a process for carrying out a plan.

An example of the plan conversation control process will be described with reference to FIGS. 19, 20.

In step S1901, the plan conversation process portion 320 checks basic control state information. Information on whether or not execution of the plan is completed is stored as the basic control state information in a certain storage region. The basic control state information is employed to describe a basic control state of the plan.

Figure 21:
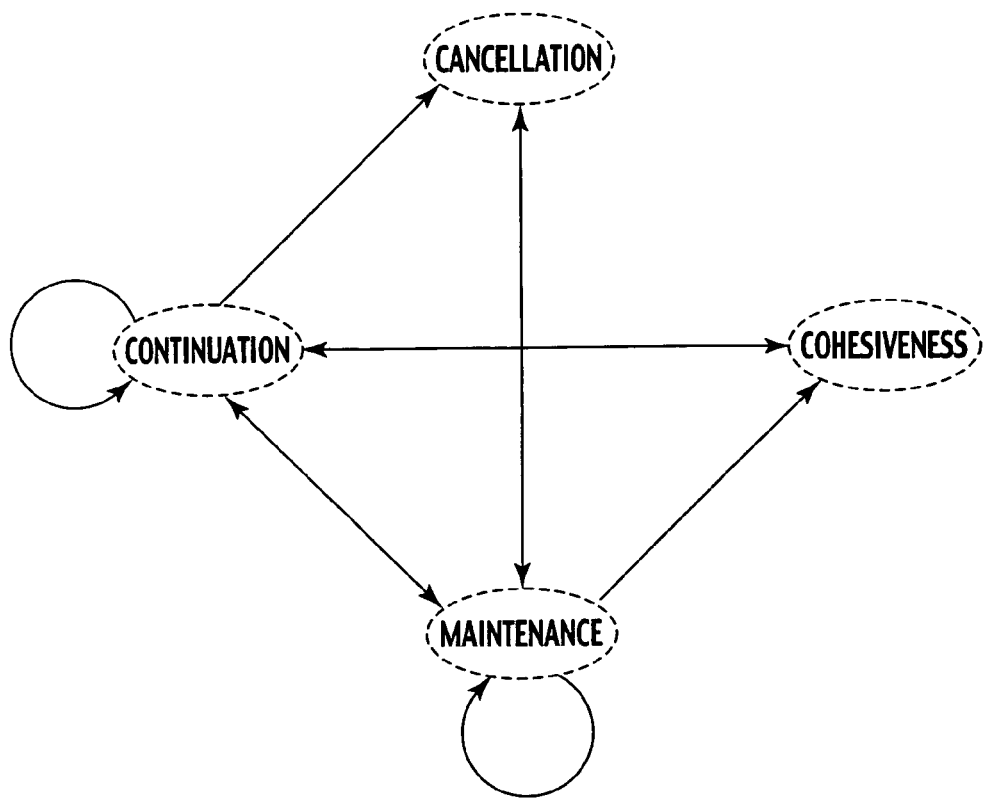
FIG. 21 is a transition diagram of a basic control state according to the first exemplary embodiment of the present invention.

As shown in FIG. 21, a plan type called a scenario has four basic control states (cohesiveness, cancellation, maintenance and continuation).

(1) Cohesiveness

Cohesiveness is set in the basic control state information when a user utterance is related to a plan 1402 in execution, more specifically, related to a topic title 820 or an example sentence 1701 corresponding to the plan 1402. In the cohesiveness, the plan conversation process portion 320 finishes the plan 1402 and then transfers to another plan 1402 corresponding to the reply sentence 1501 designated by the next plan designation information 1502.

(2) Cancellation

Cancellation is set in the basic control state information when the contents of a user utterance is determined to require completion of a plan 1402 or an interest of a user is determined to transfer a matter other than a plan in execution. In the cancellation, the plan conversation process portion 320 searches whether or not there is another plan 1402, which corresponds to the user utterance, other than the plan 1402 subject to the cancellation. If there is the another plan 1402, the plan conversation process portion 320 starts execution of the another plan 1402. If there is not the another plan 1402, the plan conversation process portion 320 finishes execution of a series of plans.

(3) Maintenance

Maintenance is set in the basic control state information when a user utterance is not related to a plan 1402 in execution, more specifically, related to a topic title 820 or an example sentence 1701 corresponding to the plan 1402, and the user utterance does not correspond to the basic control state "cancellation".

In the maintenance, the plan conversation process portion 320 determines whether or not a plan 1402 in a pending/stopping state is reexecuted when receiving a user utterance. If the user utterance is not adapted to the reexecution of the plan 1402 (e.g. the user utterance is not related to a topic title 820 or an example sentence 1701 corresponding to the plan 1402), the plan conversation process portion 320 strats execution of another plan 1402 or executes a discourse space conversation control process (step S1802) to be described hereinafter. If the user utterance is adapted to the reexecution of the plan 1402, the plan conversation process portion 320 outputs a reply sentence 1501 based on the stored next plan designation information 1502.

Further, in the maintenance, if the user utterance is not related to the associated plan 1402, the plan conversation process portion 320 searches another plan 1402 so as to output a reply sentence other than the reply sentence 1501 corresponding to the associated plan 1402, or executes the discourse space conversation control process. However, if the user utterance is again related to the associated plan 1402, the plan conversation process portion 320 reexecutes the associated plan 1402.

(4) Continuation

Continuation is set in the basic control state information when a user utterance is not related to a reply sentence 1501 included in a plan 1402 in execution, the contents of the user utterance do not correspond to the basic control sate "cancellation", and the intention of user to be interpreted based on the user utterance is not clear.

In the continuation, the plan conversation process portion 320 determines whether or not a plan 1402 in a pending/stopping state is reexecuted when receiving a user utterance. If the user utterance is not adapted to the reexecution of the plan 1402, the plan conversation process portion 320 executes a CA conversation control process to be described below so as to output a reply sentence for drawing out an utterance from the user.

In step S1902, the plan conversation process portion 320 determines whether or not the basic control state set in the basic control state information is the cohensiveness. If the basic control state is the cohensiveness, the process proceeds to step S1903. In step S1903, the plan conversation process portion 320 determines whether or not a reply sentence 1501 is a final reply sentence in a plan 1402 in execution.

If the reply sentence 1501 is the final reply sentence, the process proceeds to step S1904. In step S1904, the plan conversation process portion 320 searches in the plan space in order to determine whether or not another plan 1402 is started because the plan conversation process portion 320 already passed on all contents to be replied to the user. In step S1905, the plan conversation process portion 320 determines whether or not there is the another plan 1402 corresponding to the user utterance in the plan space. If there is not the another plan 1402, the plan conversation process portion 320 finishes the plan conversation control process because there is not any plan 1402 to be provided to the user.

If there is the another plan 1402, the process proceeds to step S1906. In step S1906, the plan conversation process portion 320 transfers into the another plan 1402 in order to start execution of the another plan 1402 (output of a reply sentence 1501 included in the another plan 1402).

In step S1908, the plan conversation process portion 320 outputs the reply sentence 1501 included in the associated plan 1402. The reply sentence 1501 is output as a reply to the user utterance, which provides information to be sent to the user. The plan conversation process portion 320 finishes the plan conversation control process when having finished a reply sentence output process in the step S1908.

On the other hand, in step S1903, if the reply sentence 1501 is not the final reply sentence, the process proceeds to step S1907. In step S1907, the plan conversation process portion 320 transfers into a plan 1402 corresponding to a reply sentence 1501 following the output reply sentence 1501, that is, a reply sentence 1501 identified by the next plan designation information 1502. Then, the process proceeds to step S1908.

In step S1902, if the basic control state is not the cohensiveness, the process proceeds to step S1909. In step S1909, the plan conversation process portion 320 determines whether or not the basic control state set in the basic control state information is the cancellation. If the basic control state is the cancellation, the process proceeds to step S1904 because there is not a plan 1402 to be continued. If the basic control state is not the cancellation, the process proceeds to step S1910.

In step S1910, the plan conversation process portion 320 determines whether or not the basic control state set in the basic control state information is the maintenance. If the basic control state is the maintenance, the plan conversation process portion 320 searches whether or not a user is interested in a plan 1402 in a pending/stopping state. If the user is interested in the plan 1402, the plan conversation process portion 320 reexecutes the plan 1402 in the pending/stopping state.

Figure 20:
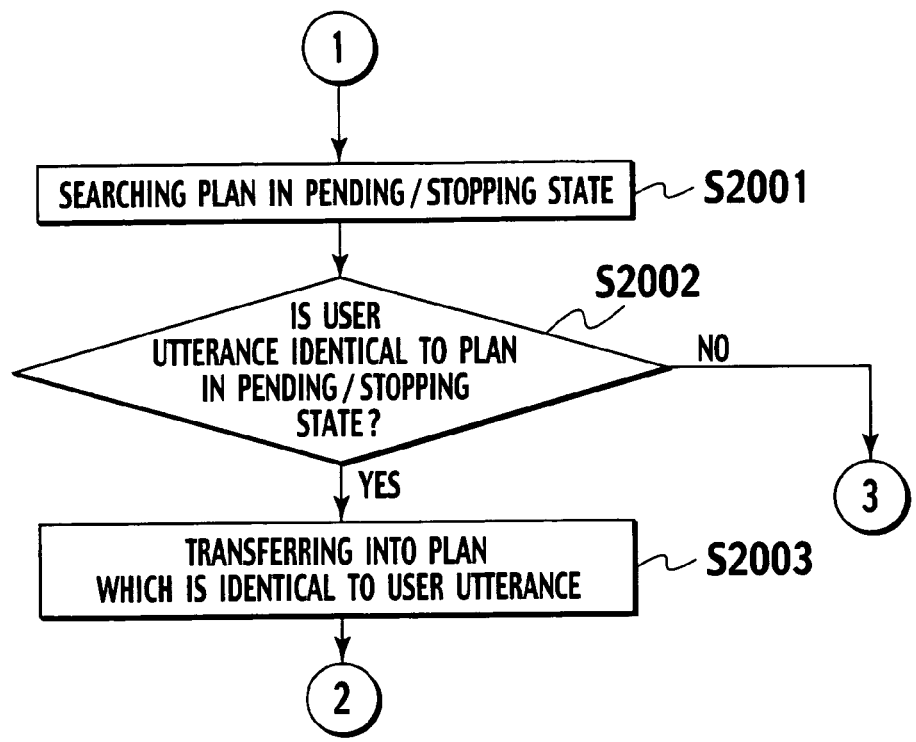
FIG. 20 is a flow chart of the rest of the plan conversation control process according to the first exemplary embodiment of the present invention.

More specifically, as shown in FIG. 20, the plan conversation process portion 320 searches a plan 1402 in a pending/stopping state in step S2001, and then determines whether or not a user utterance is related to the plan 1402 in the pending/stopping state in step S2002. If the user utterance is related to the plan 1402, the process proceeds to step S2003. In step S2003, the plan conversation process portion 320 transfers into the plan 1402 which is related to the user utterance, and then the process proceeds to step S1908. Thus, the plan conversation process portion 320 is capable of reexecuting a plan 1402 in a pending/stopping state according to a user utterance, which can pass on all contents included in a plan 1402 previously prepared to a user. If the user utterance is not related to the plan 1402, the process proceeds to step S1904.

In step S1910, if the basic control state is not the maintenance, the plan conversation process portion 320 finishes the plan conversation control process without outputting a reply sentence because the basic control state is the continuation.

As shown in FIG. 18, when the plan conversation control process is finished, the conversation control unit 300 executes the discourse space conversation control process (step S1802). It is noted that the conversation control unit 300 directly executes a basic control information update process (step S1804) without executing the discourse space conversation control process (step S1802) and a CA conversation control process (step S1803) and then finishes a main process, when the reply sentence is output in the plan conversation control process (step S1801).

Figure 22:
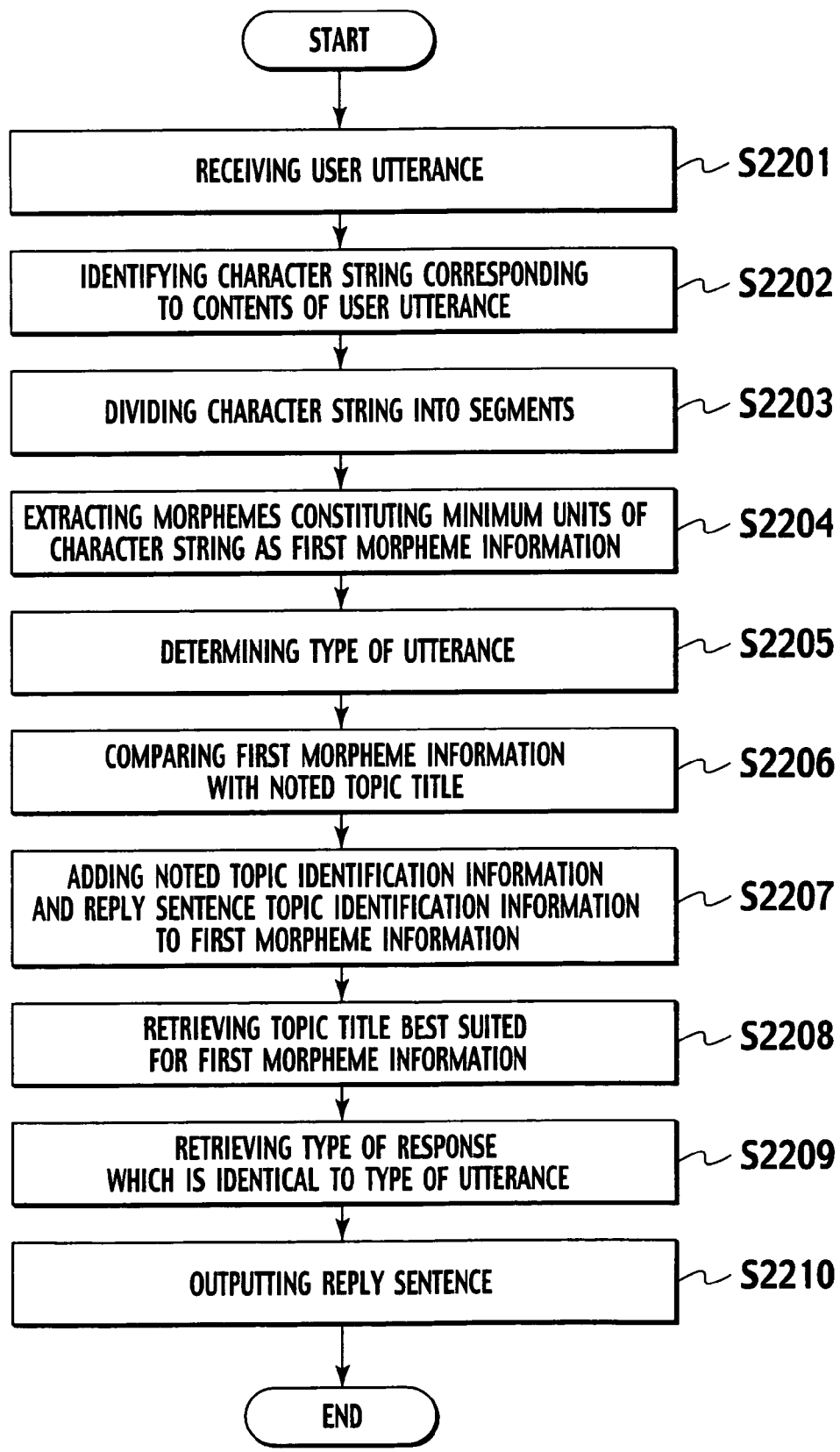
FIG. 22 is a flow chart of a discourse space conversation control process according to the first exemplary embodiment of the present invention.

As shown in FIG. 22, in step S2201, the input unit 100 receives a user utterance provided from a user. More specifically, the input unit 100 receives sounds in which the user utterance is carried out. The input unit 100 outputs a speech corresponding to received contents of an utterance as a speech signal to the speech recognition unit 200. It is noted that the input unit 100 may receive a character string (e.g. character data input in a text format) input by a user instead of the sounds. In this case, the input unit 100 is a character input device such as a key board or a touch panel for inputting character information.

In step S2202, the speech recognition unit 200 identifies a character string corresponding to the contents of the utterance, based on the contents of the utterance retrieved by the input device 100. More specifically, the speech recognition unit 200, when receiving the speech signal from the input unit 100, identifies a word hypothesis (candidate) corresponding to the speech signal. Then, the speech recognition unit 200 retrieves a character string corresponding to the identified word hypothesis and outputs the retrieved character string to the conversation control unit 300 (discourse space conversation control process portion 330) as a character string signal.

In step S2203, the character string identifying portion 410 divides a character string identified at the speech recognition unit 200 into segments. A segment means a sentence resulting from dividing a character string as much as possible to the extent of not breaking the grammatical meaning. More specifically, when a character string includes a time interval exceeding a certain level, the character string identifying portion 410 divides the character string at that portion. The character string identifying portion 410 outputs the resulting character strings to the morpheme extracting portion 420 and the input type determining portion 440. It is preferred that the character string identifying portion 410 divides a character string at a portion where there is punctuation or space in a case where the character string is input from a key board.

In step S2204, based on the character string identified at the character string identifying portion 410, the morpheme extracting portion 420 extracts morphemes constituting minimum units of the character string as first morpheme information. More specifically, when receiving a character string from the character string identifying portion 410, the morpheme extracting portion 420 compares the received character string with a morpheme group previously stored in the morpheme database 430. The morpheme group is prepared as a morpheme dictionary in which a direction word, a reading, a part of speech and an inflected form are described every morpheme which belongs to respective parts of speech. Upon the comparison, the morpheme extracting portion 420 extracts, from the received character string, morphemes (m1, m2, . . . ) matching some of the stored morpheme group. The morpheme extracting portion 420 outputs the extracted morphemes to the topic identification information retrieval portion 350 as the first morpheme information.

In step S2205, the input type determining portion 440 determines the type of utterance, based on the character string identified at the character string identifying portion 410. More specifically, when receiving a character string from the character string identifying portion 410, the input type determining portion 440 compares the received character string with the dictionaries stored in the utterance type database 450, based on the character string. Upon the comparison, the input type determining portion 440 extracts elements relevant to the dictionaries from the character string. Based on the extracted elements, the input type determining portion 440 determines which type of the uttered sentence each extracted element belongs to. The input type determining portion 440 outputs the determined type of the uttered sentence (the type of utterance) to the reply retrieval portion 380.

In step S2206, the topic identification information retrieval portion 350 compares first morpheme information extracted at the morpheme extracting portion 420 with a noted topic title $820_{focus}$. If a morpheme constituting part of the first morpheme information is related to the noted topic title $820_{focus}$, the topic identification information retrieval portion 350 outputs the noted topic title $820_{focus}$ to the reply retrieval portion 380. If a morpheme constituting part of the first morpheme information is not related to the noted topic title $820_{focus}$, the topic identification information retrieval portion 350 outputs the received first morpheme information and user input sentence topic identification information to the elliptical sentence complementation portion 360 as the search command signal.

In step S2207, the elliptical sentence complementation portion 360 adds noted topic identification information and reply sentence topic identification information to the received first morpheme information, based on the first morpheme information received from the topic identification information retrieval portion 350. More specifically, with the first morpheme information as "W", and with a set of the noted topic identification information and the reply sentence topic identification information as "D", the elliptical sentence complementation portion 360 adds one or more elements of the set "D" to the first morpheme information "W" and generates the complemented first morpheme information. Then, the elliptical sentence complementation portion 360 compares the complemented first morpheme information with all topic titles 820 associated with the set "D" and searches a topic title 820 which is related to the complemented first morpheme information. If there is the topic title 820 which is related to the complemented first morpheme information, the elliptical sentence complementation portion 360 outputs the topic title 820 to the reply retrieval portion 380. If there is not the topic title 820 which is related to the complemented first morpheme information, the elliptical sentence complementation portion 360 outputs the first morpheme information and the user input sentence topic identification information to the topic retrieval portion 370.

In step S2208, the topic retrieval portion 370 compares the first morpheme information with the user input sentence topic identification information, and retrieves a topic title 820 best suited for the first morpheme information from among the topic titles 820. More specifically, when the topic retrieval portion 370 receives the search command signal from the elliptical sentence complementation portion 360, the topic retrieval portion 370 retrieves a topic title 820 best suited for the first morpheme information from among topic titles 820 associated with the user input sentence topic identification information, based on the user input sentence topic identification information and the first morpheme information included in the received search command signal. The topic retrieval portion 370 outputs the retrieved topic title 820 to the reply retrieval portion 380 as a search result signal.

In step S2209, based on a topic title 820 retrieved at the topic identification information retrieval portion 350, the elliptical sentence complementation portion 360 or the topic retrieval portion 370, the reply retrieval portion 380 compares different types of response associated with the topic title 820 with the type of utterance determined at the input type determining portion 440. Upon the comparison, the reply retrieval portion 380 retrieves a type of response which is identical to the determined type of utterance from among the types of response. For example, when the reply retrieval portion 380 receives the search result signal from the topic retrieval portion 370 and the type of utterance from the input type determining portion 440, the reply retrieval portion 380, based on a topic title corresponding to the received search result signal and the received type of utterance, identifies the type of response which is identical to the type of utterance (e.g. DA) among from the types of response associated with the topic title.

In step S2210, the reply retrieval portion 380 outputs the reply sentence 830 retrieved in step S2209 to the output unit 600 via the manage portion 310. When the output unit 600 receives the reply sentence 830 from the management portion 310, the output unit 600 outputs the received reply sentence 830.

As shown in FIG. 18, when the discourse space conversation control process is finished, the conversation control unit 300 executes the CA conversation control process (step S1803). It is noted that the conversation control unit 300 directly executes the basic control information update process (step S1804) without executing and the CA conversation control process (step S1803) and then finishes the main process, when the reply sentence is output in the discourse space conversation control process (step S1802).

In the CA conversation control process, the conversation control unit 300 determines whether a user utterance is an utterance for explaining something, an utterance for identifying something, an utterance for accusing or attacking something, or an utterance other than the above utterances, and then outputs a reply sentence corresponding to the contents of the user utterance and the determination result. Thereby, even if a reply sentence suited for the user utterance is not output in the plan conversation control process or the discourse space conversation control process, the conversation control unit 300 can output a bridging reply sentence which allows the flow of conversation to continued.

In step S1804, the conversation control unit 300 executes the basic control information update process. In the basic control information update process, the manage portion 310 of the conversation control unit 300 sets the cohesiveness in the basic control information when the plan conversation process portion 320 outputs a reply sentence. When the plan conversation process portion 320 stops outputting a reply sentence, the manage portion 310 sets the cancellation in the basic control information. When the discourse space conversation control process portion 330 outputs a reply sentence, the manage portion 310 sets the maintenance in the basic control information. When the CA conversation process portion 340 outputs a reply sentence, the manage portion 310 sets the continuation in the basic control information.

The basic control information set in the basic control information update process is referred in the plan conversation control process (step S1801) to be employed for continuation or resumption of a plan.

As described the above, the conversation controller 1 can carry out a plan which is previously prepared according to a user utterance and respond accurately to a topic which is not included in a plan, by executing the main process every time the user utterance is received.

B. Second Exemplary Embodiment

The conversation controller 1 according to the second exemplary embodiment deals with a plan of a type called a guide discourse. The guide discourse means that a user is guided to take information such as a consequence or an advice by repeating a question for the user. A part of plans 1402 stored in the conversation database 500 of the conversation controller 1 has a series of questions for guiding a user as a reply sentence. Next plan designation information included in each of the plans 1402 having the series of questions is information for designating a plurality of next candidate reply sentences.

In the second exemplary embodiment, the configuration and operation which are different from those of the first exemplary embodiment will be described and the configuration and operation which are the same as those of the first exemplary embodiment will be omitted.

Figure 23:
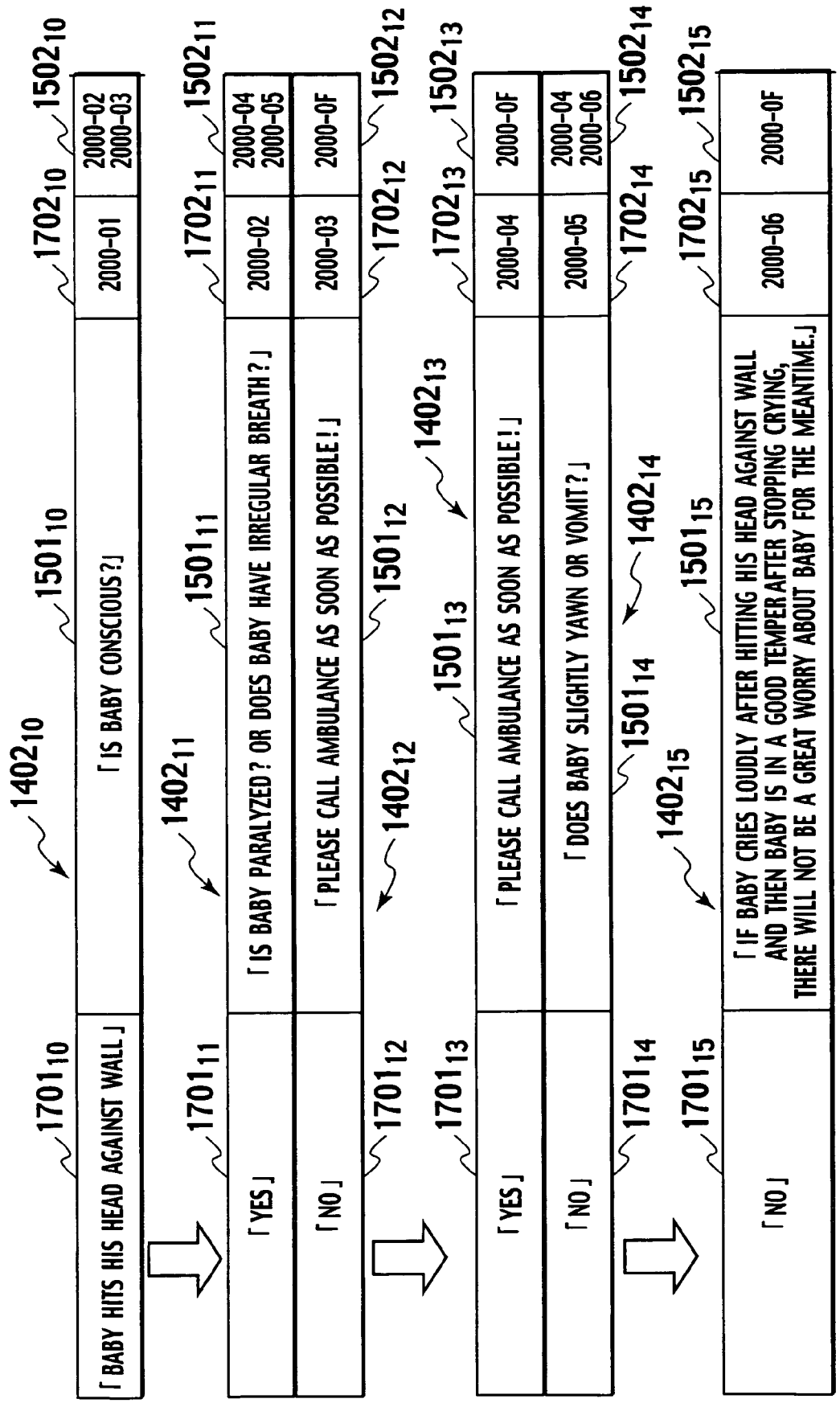
FIG. 23 is a diagram illustrating details of a plan conversation control process according to a second exemplary embodiment of the present invention.

As shown in FIG. 23, plans $1402_{10}$, $1402_{11}$, $1402_{12}$, $1402_{13}$, $1402_{14}$, $1402_{15}$ have respectively reply sentences $1501_{10}$, $1501_{11}$, $1501_{12}$, $1501_{13}$, $1501_{14}$, $1501_{15}$ for a child-care consultation from a mother who is raising a child. In the example of FIG. 23, the plan $1402_{11}$, $1402_{13}$ have selective relations with the plan $1402_{12}$, $1402_{14}$, respectively. When the plan $1402_{12}$ ($1402_{12}$) and/or $1402_{13}$ ($1402_{14}$) are/is selected, the plan $1402_{12}$ ($1402_{11}$) and/or $1402_{14}$ ($1402_{13}$) are/is not selected.

The plans $1402_{10}$, $1402_{11}$, $1402_{12}$, $1402_{13}$, $1402_{14}$, $1402_{15}$ include therein ID data $1702_{10}$, $1702_{11}$, $1702_{12}$, $1702_{13}$, $1702_{14}$, $1702_{15}$, which have values 2000-01, 2000-02, 2000-03, 2000-04, 2000-5, 2000-06, respectively. The plans $1402_{10}$, $1402_{11}$, $1402_{12}$, $1402_{13}$, $1402_{14}$, $1402_{15}$ further include therein next plan designation information $1502_{10}$, $1502_{11}$, $1502_{12}$, $1502_{13}$, $1502_{14}$, $1502_{15}$, which have values 2000-02 and 2000-03, 2000-04 and 2000-05, 2000-0F, 2000-0F, 2000-04 and 2000-06, 2000-0F respectively. Numbers "0F" below a hyphen of the next plan designation information $1502_{12}$, $1502_{13}$, $1502_{15}$ show that the reply sentence $1501_{12}$, $1501_{13}$, $1501_{15}$ are ends of a series of questions because there are no plans to be output following the reply sentence $1501_{12}$, $1501_{13}$, $1501_{15}$.

In the example of FIG. 23, if a user utterance is "a baby hits his head against a wall", the plan conversation process portion 320 starts to execute this series of plans. More specifically, when the plan conversation process portion 320 receives the user utterance "a baby hits his head against the wall", the plan conversation process portion 320 searches the plan space 1401 and checks whether or not there is the plan $1402_{10}$ which includes the reply sentence $1501_{10}$ corresponding to the user utterance. Here, a user utterance character string $1701_{10}$ included in the plan $1402_{10}$ corresponds to the user utterance "a baby hits his head against the wall".

If the plan conversation process portion 320 discovers the plan $1402_{10}$, the plan conversation process portion 320 retrieves the reply sentence $1501_{10}$ included in the plan $1402_{10}$. Then, the plan conversation process portion 320 outputs the reply sentence $1501_{10}$ as a reply sentence "is the baby conscious?" for the user utterance and identifies one or more next candidate reply sentences with reference to the next plan designation information $1502_{10}$. The next plan designation information $1502_{10}$ includes two ID data 2000-02, 2000-03. The plan conversation process portion 320 identifies two plans $1402_{11}$, $1402_{12}$ corresponding to the two ID data 2000-02, 2000-03 as two next candidate reply sentences.

When a user utterance for answering the reply sentence "is the baby conscious?" is "yes", the plan conversation process portion 320 selects the plan $1402_{11}$ corresponding to the user utterance and carries out the plan $1402_{11}$. Then, the plan conversation process portion 320 outputs a reply sentence "is the baby paralyzed? or does the baby have inrregular breath?" and identifies one or more next candidate reply sentences with reference to the next plan designation information $1502_{11}$. The next plan designation information $1502_{11}$ includes two ID data 2000-04, 2000-05. The plan conversation process portion 320 identifies two plans $1402_{13}$, $1402_{14}$ corresponding to the two ID data 2000-04, 2000-05 as two next candidate reply sentences.

In contrast, when the user utterance for answering the reply sentence "is the baby conscious?" is "no", the plan conversation process portion 320 selects the plan $1402_{12}$ corresponding to the user utterance and carries out the plan $1402_{12}$. Then, the plan conversation process portion 320 outputs a reply sentence "please call an ambulance as soon as possible!" and identifies the end of the series of questions with reference to the next plan designation information $1502_{12}$. Finally, the plan conversation process portion 320 finishes this plan conversation process.

When the user utterance for answering the reply sentence "is the baby paralyzed? or does the baby have inrregular breath?" is "yes", the plan conversation process portion 320 selects the plan $1402_{13}$ corresponding to the user utterance and carries out the plan $1402_{13}$. Then, the plan conversation process portion 320 outputs a reply sentence "please call an ambulance as soon as possible!" and identifies the end of the series of questions with reference to the next plan designation information $1502_{13}$. Finally, the plan conversation process portion 320 finishes this plan conversation process.

In contrast, when a user utterance for answering the reply sentence "is the baby paralyzed? or does the baby have inrregular breath?" is "no", the plan conversation process portion 320 selects the plan $1402_{14}$ corresponding to the user utterance and carries out the plan $1402_{14}$. Then, the plan conversation process portion 320 outputs a reply sentence "does the baby slightly yawn or vomit?" and identifies one or more next candidate reply sentences with reference to the next plan designation information $1502_{14}$. The next plan designation information $1502_{14}$ includes two ID data 2000-04, 2000-06. The plan conversation process portion 320 identifies two plans $1402_{13}$, $1402_{15}$ corresponding to the two ID data 2000-04, 2000-06 as two next candidate reply sentences.

When the user utterance for answering the reply sentence "does the baby slightly yawn or vomit?" is "yes", the plan conversation process portion 320 selects the plan $1402_{13}$ corresponding to the user utterance and carries out the plan $1402_{13}$. Then, the plan conversation process portion 320 outputs a reply sentence "please call an ambulance as soon as possible!" and identifies the end of the series of questions with reference to the next plan designation information $1502_{13}$. Finally, the plan conversation process portion 320 finishes this plan conversation process.

In contrast, when the user utterance for answering the reply sentence "does the baby slightly yawn or vomit?" is "no", the plan conversation process portion 320 selects the plan $1402_{15}$ corresponding to the user utterance and carries out the plan $1402_{15}$. Then, the plan conversation process portion 320 outputs a reply sentence "if the baby cries loudly after hitting his head against the wall and then baby is in a good temper after stopping crying, there will not be a great worry about the baby for the meantime" and identifies the end of the series of questions with reference to the next plan designation information $1502_{15}$. Finally, the plan conversation process portion 320 finishes this plan conversation process.

Figure 24:
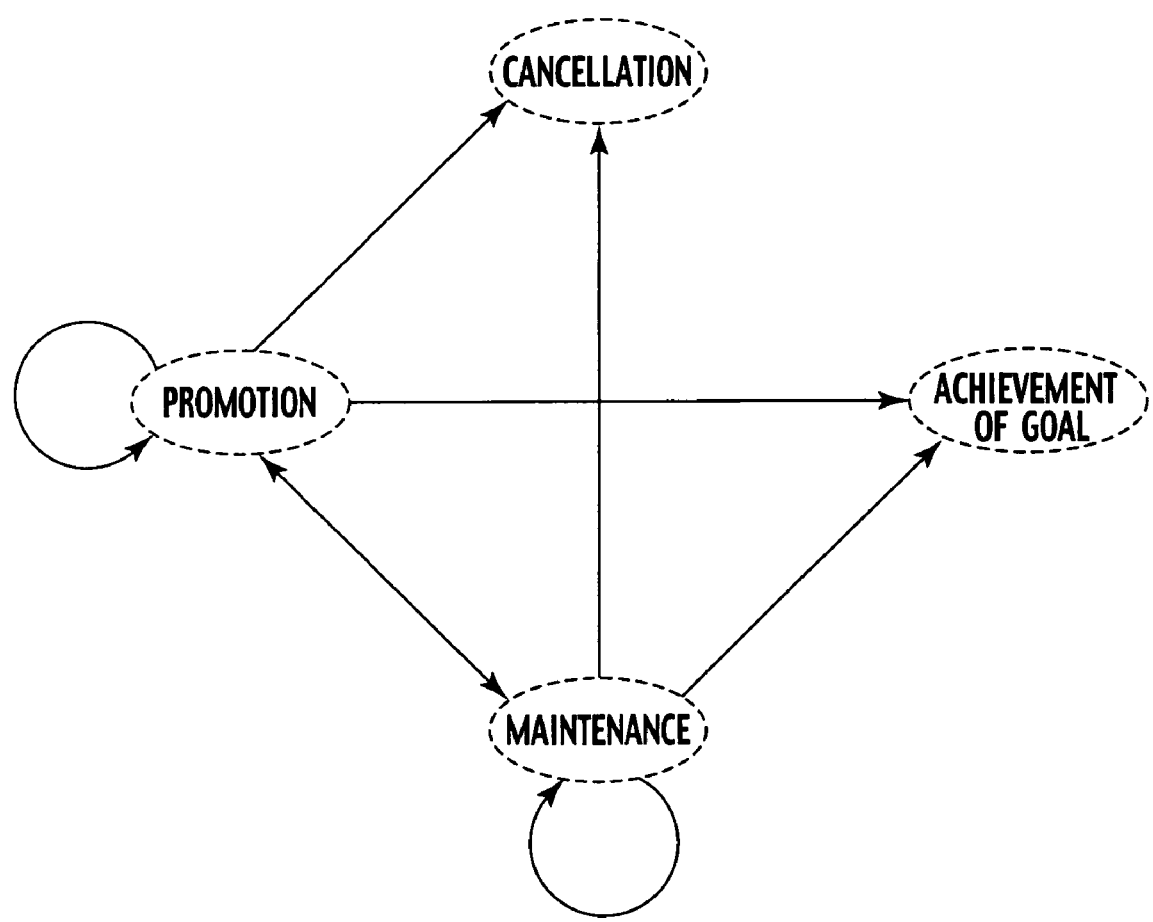
FIG. 24 is a transition diagram of a basic control state according to a second exemplary embodiment of the present invention.

As shown in FIG. 24, a plan type called a scenario according to the second exemplary embodiment has four basic control states (achievement of goal, cancellation, maintenance and promotion).

(1) Achievement of Goal

Achievement of goal is a basic control state corresponding to the cohesiveness shown in FIG. 21. The achievement of goal is set in the basic control state information when a user utterance is related to a plan 1402 in execution, more specifically, related to a topic title 820 or an example sentence 1701 corresponding to the plan 1402. In the achievement of goal, the plan conversation process portion 320 finishes the plan 1402 and then transfers to another plan 1402 corresponding to the reply sentence 1501 designated by the next plan designation information 1502.

(2) Cancellation

Cancellation is a basic control state corresponding to the cancellation shown in FIG. 21. The cancellation is set in the basic control state information when the contents of a user utterance is determined to require completion of a plan 1402 or an interest of a user is determined to transfer a matter other than a plan in execution. In the cancellation, the plan conversation process portion 320 searches whether or not there is another plan 1402, which corresponds to the user utterance, other than the plan 1402 subject to the cancellation. If there is the another plan 1402, the plan conversation process portion 320 starts execution of the another plan 1402. If there is not the another plan 1402, the plan conversation process portion 320 finishes execution of a series of plans.

(3) Maintenance

Maintenance is a basic control state corresponding to the maintenance shown in FIG. 21. The maintenance is set in the basic control state information when a user utterance is not related to a plan 1402 in execution, more specifically, related to a topic title 820 or an example sentence 1701 corresponding to the plan 1402, and the user utterance does not correspond to the basic control state "cancellation".

In the maintenance, the plan conversation process portion 320 determines whether or not a plan 1402 in a pending/stopping state is reexecuted when receiving a user utterance. If the user utterance is not adapted to the reexecution of the plan 1402 (e.g. the user utterance is not related to a topic title 820 or an example sentence 1701 corresponding to the plan 1402), the plan conversation process portion 320 strats execution of another plan 1402 or executes a discourse space conversation control process (step S1902) to be described hereinafter. If the user utterance is adapted to the reexecution of the plan 1402, the plan conversation process portion 320 outputs a reply sentence 1501 based on the stored next plan designation information 1502.

Further, in the maintenance, if the user utterance is not related to the associated plan 1402, the plan conversation process portion 320 searches another plan 1402 so as to output a reply sentence other than the reply sentence 1501 corresponding to the associated plan 1402, or executes the discourse space conversation control process. However, if the user utterance is again related to the associated plan 1402, the plan conversation process portion 320 reexecutes the associated plan 1402.

(4) Promotion

Promotion is a basic control state corresponding to the continuation shown in FIG. 21. The promotion is set in the basic control state information when a user utterance is not related to a reply sentence 1501 included in a plan 1402 in execution, the contents of the user utterance do not correspond to the basic control sate "cancellation", and the intention of user to be interpreted based on the user utterance is not clear.

In the promotion, the plan conversation process portion 320 determines whether or not a plan 1402 in a pending/stopping state is reexecuted when receiving a user utterance. If the user utterance is not adapted to the reexecution of the plan 1402, the plan conversation process portion 320 executes the CA conversation control process to be described above so as to output a reply sentence for drawing out an utterance from the user.

Figure 19:
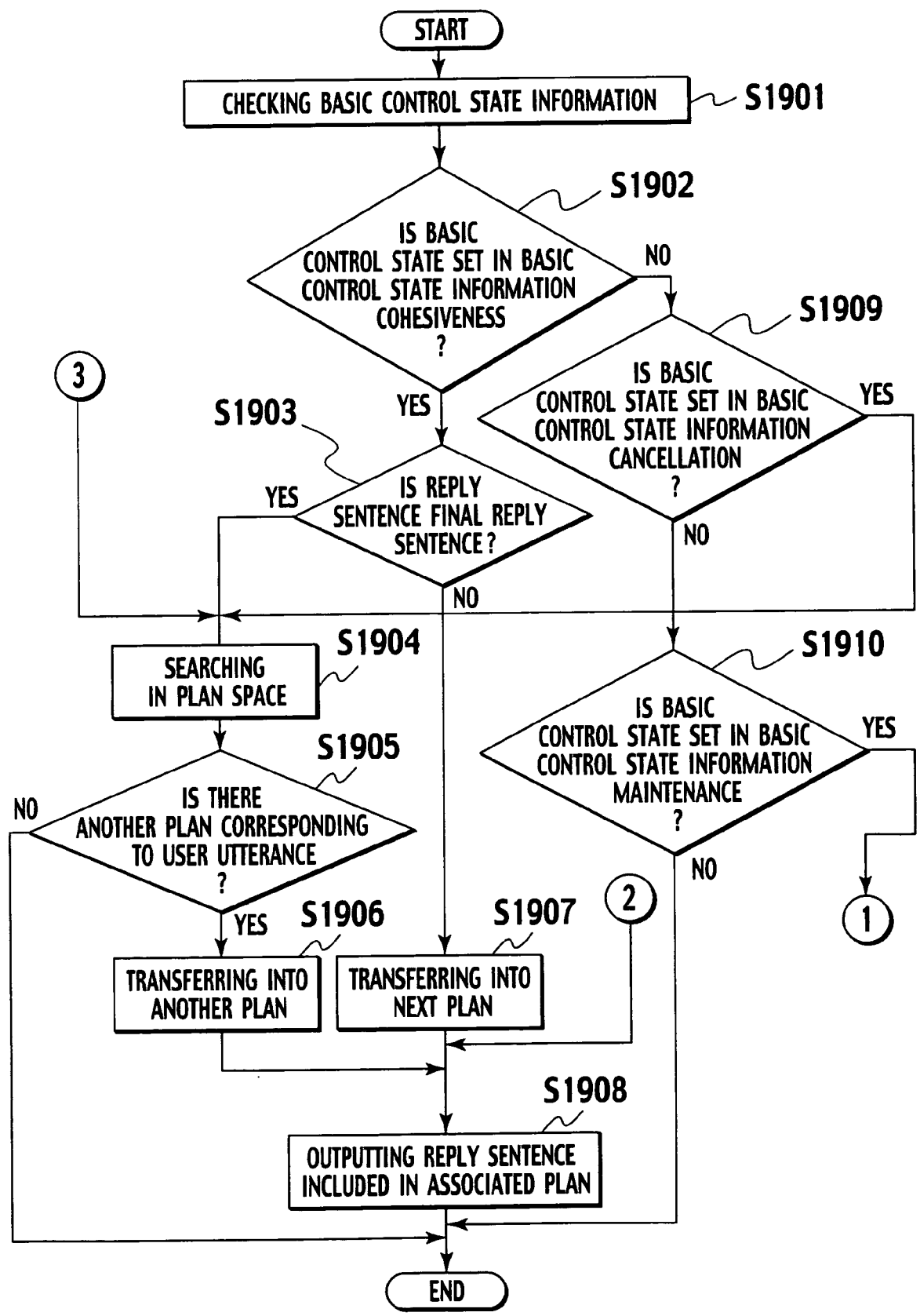
FIG. 19 is a flow chart of a part of a plan conversation control process according to the first exemplary embodiment of the present invention.
Figure 25:
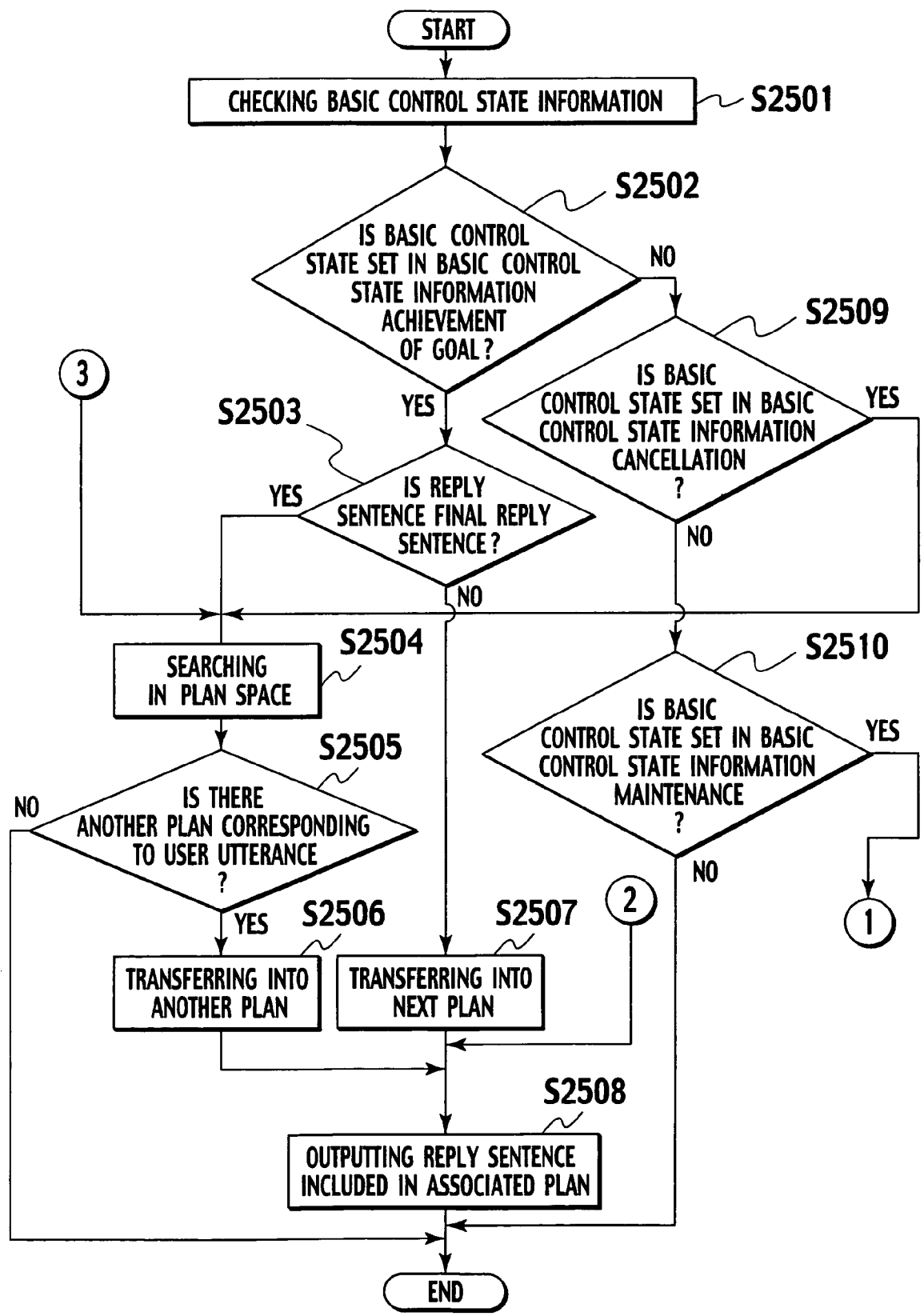
FIG. 25 is a flow chart of a part of a plan conversation control process according to a second exemplary embodiment of the present invention.
Figure 26:
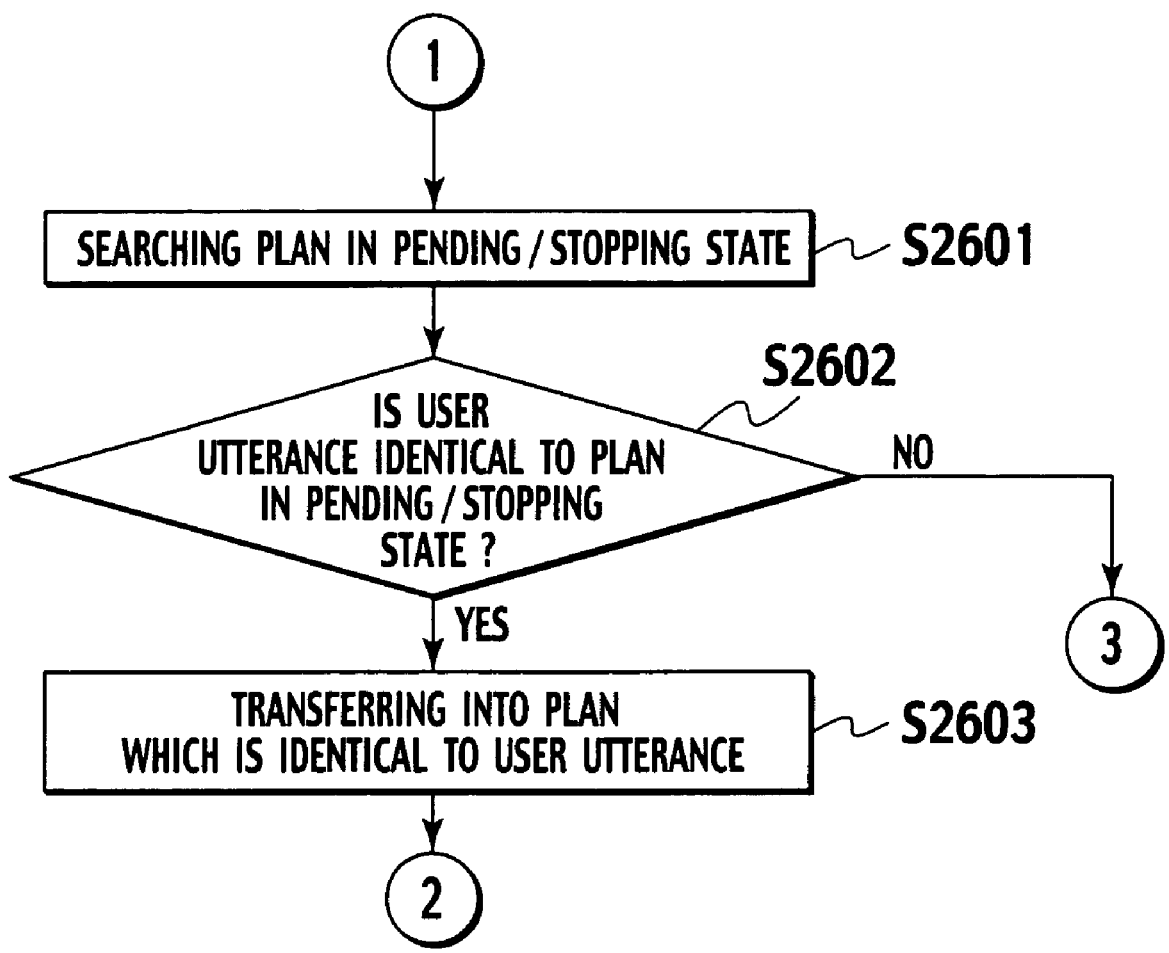
FIG. 26 is a flow chart of the rest of the plan conversation control process according to a second exemplary embodiment of the present invention.

A plan conversation control process shown in FIGS. 25, 26 deals with the plan of the type called the guide discourse, and is the same as the plan conversation control process shown in FIGS. 19, 20 except for changing "cohesiveness" into "achievement of goal" in step S2502. More specifically, steps S2501 to S2510 in FIG. 25 correspond to steps S1901 to S1910 in FIG. 19 and steps S2601 to S2603 in FIG. 26 correspond to steps S2001 to S2003 in FIG. 20.

The conversation controller 1 according to the second exemplary embodiment can provide a conversation allowing a user to take information such as a consequence or an advice which is previously prepared therein, by repeating a question for the user.

What is claimed is:

1. A conversation controller configured to output a reply sentence according to a user utterance, comprising:
    a plan memory unit, comprising a memory that stores a plurality of plans, wherein each plan has a reply sentence and one or more pieces of next candidate designation information for designating a next candidate reply sentence to be output following the reply sentence;
    a plan conversation unit, comprising a processor that selects one of the plurality of plans stored in the plan memory unit according to a first user utterance and outputs a reply sentence which the selected plan has, and selects one piece of the next candidate designation information which the plan has according to a second user utterance and outputs a next candidate reply sentence corresponding to the selected piece of the next candidate designation information, wherein the plan conversation unit withholds an output of the next candidate reply sentence when a second user utterance is received, which is not related to the next candidate reply sentence or it is unclear whether or not there is a relation between the second user utterance and the next candidate reply sentence;
    a discourse space conversation unit that outputs a reply sentence about a topic which is not related to the withheld next candidate reply sentence according to the second user utterance;
    a morpheme extracting unit that extracts, based on a character string corresponding to the second user utterance, at least one morpheme comprising a minimum unit of the character string, as first morpheme information; and
    a conversation database that stores a plurality of pieces of topic identification information for identifying a topic, a plurality of pieces of second morpheme information, each of which includes a morpheme including a character, a string of characters or a combination of the character and the string of characters, and a plurality of reply sentences, wherein one piece of topic identification information is associated with one or more pieces of second morpheme information, and at least one piece of second morpheme information is associated with one reply sentence,
    wherein the discourse space conversation unit comprises:
    a topic identification information retrieval portion that compares, based on first morpheme information extracted by the morpheme extracting unit, the first morpheme information with the plurality of pieces of topic identification information, and when the topic identification information retrieval portion retrieves topic identification information including a part of the first morpheme information from among the plurality of pieces of topic identification information and the retrieved topic identification information includes second morpheme information including a part of the first morpheme information, the topic identification information retrieval portion outputs the second morpheme information to the reply retrieval portion;
    an elliptical sentence supplementation portion that, when the retrieved topic identification information does not include second morpheme information including a part of the first morpheme information, adds topic identification information previously retrieved by the topic identification information retrieval portion to the first morpheme information to provide supplemented first morpheme information;
    a topic retrieval portion that compares the supplemented first morpheme information with one or more pieces of second morpheme information associated with the retrieved topic identification information, and retrieves second morpheme information associated with the retrieved topic identification information including a part of the supplemented first morpheme information from among the one or more pieces of second morpheme information, and outputs the retrieved second morpheme information to the reply retrieval portion; and
    a reply retrieval portion that retrieves, based on the second morpheme information from one of the topic identification information retrieval portion and the topic retrieval portion, a reply sentence associated with the retrieved second morpheme information,
    wherein some plans have a series of questions for guiding a user to take desired information as the reply sentences.

2. The conversation controller according to claim 1, wherein the plan conversation unit outputs the withheld next candidate reply sentence when receiving a third user utterance which is related to the withheld next candidate reply sentence.

3. The conversation controller according to claim 1, further comprising a conversation continuation unit that outputs a reply sentence for drawing out a further utterance from a user when not outputting the reply sentence about the topic which is not related to the withheld next candidate reply sentence.

4. A conversation controller configured to output a reply sentence according to a user utterance, comprising:
    a plan memory unit, comprising a memory that stores a plurality of plans, wherein each plan has a reply sentence and one or more pieces of next candidate designation information for designating a next candidate reply sentence to be output following the reply sentence;
    a plan conversation unit, comprising a processor that selects one of the plurality of plans stored in the plan memory unit according to a first user utterance and outputs a reply sentence which the selected plan has, and selects one piece of the next candidate designation information which the plan has according to a second user utterance and outputs a next candidate reply sentence corresponding to the selected piece of the next candidate designation information, wherein the plan conversation unit withholds an output of the next candidate reply sentence when the second user utterance is received, which is not related to the next candidate reply sentence or it is unclear whether or not there is a relation between the second user utterance and the next candidate reply sentence;
    a discourse space conversation unit that outputs a reply sentence about a topic which is not related to the withheld next candidate reply sentence according to the second user utterance;
    a morpheme extracting unit that extracts, based on a character string corresponding to the second user utterance, at least one morpheme comprising a minimum unit of the character string, as first morpheme information; and
    a conversation database that stores a plurality of pieces of topic identification information for identifying a topic, a plurality of pieces of second morpheme information, each of which includes a morpheme including a character, a string of characters or a combination of the character and the string of characters, and a plurality of reply sentences, wherein one piece of topic identification information is associated with one or more pieces of second morpheme information, and at least one piece of second morpheme information is associated with one reply sentence, wherein the discourse space conversation unit comprises:
a topic identification information retrieval portion that compares, based on first morpheme information extracted by the morpheme extracting unit, the first morpheme information with the plurality of pieces of topic identification information, and when the topic identification information retrieval portion retrieves topic identification information including a part of the first morpheme information from among the plurality of pieces of topic identification information and the retrieved topic identification information includes second morpheme information including a part of the first morpheme information, the topic identification information retrieval portion outputs the second morpheme information to the reply retrieval portion;

an elliptical sentence supplementation portion that, when the retrieved topic identification information does not include second morpheme information including a part of the first morpheme information, adds topic identification information previously retrieved by the topic identification information retrieval portion to the first morpheme information to generate supplemented first morpheme information, retrieves second morpheme information including a part of the supplemented first morpheme information, and outputs the retrieved second morpheme information to the reply retrieval portion; and a reply retrieval portion that retrieves, based on the second morpheme information from one of the topic identification information retrieval portion and the elliptical sentence supplementation portion, a reply sentence associated with the retrieved second morpheme information, wherein some plans have a series of questions for guiding a user to take desired information as the reply sentences.

* * * * *